(12) United States Patent
Petrovic et al.

(10) Patent No.: US 7,944,449 B2
(45) Date of Patent: May 17, 2011

(54) METHODS AND APPARATUS FOR EXPORT OF ANIMATION DATA TO NON-NATIVE ARTICULATION SCHEMES

(75) Inventors: Lena Petrovic, Union City, CA (US); John Anderson, San Anselmo, CA (US)

(73) Assignee: Pixar, Emeryville, CA (US)

( * ) Notice: Subject to any disclaimer, the term of this patent is extended or adjusted under 35 U.S.C. 154(b) by 0 days.

(21) Appl. No.: 12/408,585

(22) Filed: Mar. 20, 2009

(65) Prior Publication Data

US 2009/0179900 A1 Jul. 16, 2009

Related U.S. Application Data

(63) Continuation-in-part of application No. 12/021,289, filed on Jan. 28, 2008, now Pat. No. 7,570,264, which is a continuation of application No. 10/844,048, filed on May 11, 2004, now Pat. No. 7,333,112.

(60) Provisional application No. 60/470,590, filed on May 14, 2003, provisional application No. 60/470,767, filed on May 14, 2003.

(51) Int. Cl.
*G06T 13/00* (2006.01)

(52) U.S. Cl. ........................................................ 345/473

(58) Field of Classification Search ........................ None
See application file for complete search history.

(56) References Cited

U.S. PATENT DOCUMENTS

| | | | |
|---|---|---|---|
| 5,416,899 A * | 5/1995 | Poggio et al. ................. | 345/475 |
| 5,592,609 A * | 1/1997 | Suzuki et al. ................. | 345/473 |
| 5,731,821 A | 3/1998 | Girard | |
| 5,796,400 A | 8/1998 | Atkinson et al. | |
| 5,854,634 A * | 12/1998 | Kroitor ........................ | 345/473 |
| 5,883,638 A | 3/1999 | Rouet et al. | |
| 5,982,389 A | 11/1999 | Guenter et al. | |
| 6,011,562 A | 1/2000 | Gagne et al. | |
| 6,088,042 A | 7/2000 | Handelman et al. | |
| 6,162,120 A | 12/2000 | Takahashi et al. | |
| 6,184,901 B1 | 2/2001 | Silva et al. | |
| 6,285,794 B1 | 9/2001 | Georgiev et al. | |
| 6,322,448 B1 | 11/2001 | Kaku et al. | |
| 6,626,759 B1 | 9/2003 | Matsuoka | |

(Continued)

OTHER PUBLICATIONS

Belhumeur, P., Hager, G., Tracking in 3D: Image Variability Decomposition for Recovering Object Pose and Illumination, Dec. 1998, Pattern Analysis & Applications, vol. 2, No. 1, pp. 82-91.*

(Continued)

*Primary Examiner* — Said Broome
(74) *Attorney, Agent, or Firm* — Philip H. Albert; Kilpatrick Townsend & Stockton, LLP

(57) ABSTRACT

A method for exporting animation data from a native animation environment to a non-native animation environment includes determining first object poses in response to a first object model in the native environment and animation variables, determining a second object model including a geometric object model, determining second object poses in response to the second object model and animation variables, determining surface errors between the first object poses and the second object poses, determining a corrective object offsets in response to the surface errors, determining actuation values associated with the corrective object offsets in response to the surface errors, determining a third object model compatible with the non-native animation environment in response to the second object of poses, the corrective offsets, and the actuation values, and storing the third object model in a memory.

39 Claims, 18 Drawing Sheets

U.S. PATENT DOCUMENTS

| | | | |
|---|---|---|---|
| 6,856,319 | B2 | 2/2005 | Rose et al. |
| 6,997,882 | B1 | 2/2006 | Parker et al. |
| 7,034,836 | B2 * | 4/2006 | Colby .......................... 345/473 |
| 7,239,321 | B2 * | 7/2007 | Berger .......................... 345/473 |
| 7,333,112 | B2 | 2/2008 | Anderson |
| 7,570,264 | B2 | 8/2009 | Anderson |
| 7,689,994 | B2 | 3/2010 | Vronay et al. |
| 2002/0008704 | A1 | 1/2002 | Sheasby et al. |
| 2002/0067362 | A1 * | 6/2002 | Agostino Nocera et al. . 345/473 |
| 2002/0118198 | A1 * | 8/2002 | Hunter .......................... 345/475 |
| 2003/0231181 | A1 | 12/2003 | Rose et al. |
| 2005/0166179 | A1 | 7/2005 | Vronay et al. |

OTHER PUBLICATIONS

James et al., "Skinning Mesh Animations," International Conference on Computer Graphics and Interactive Techniques, ACM SIGGRAPH 2005 Papers, Los Angeles, CA, (2005), pp. 399-407.

Kry, Paul G. et al.; "EigenSkin: Real Time Large Deformation Character Skinning Hardware"; University of British Columbia, 7 pages.

Lewis, J.P. et al.; "Pose Space Deformation: A Unified Approach to Shape Interpolation and Skeleton-Driven Deformation"; Centropolis, pp. 165-172.

Wang, Xiaohuan C. et al.; "Multi-Weight Enveloping: Least-Squares Approximation Techniques for Skin Animation"; Industrial Light & Magic, pp. 129-138.

* cited by examiner 622            624            626

628            630            632

620

METHODS AND APPARATUS FOR EXPORT OF ANIMATION DATA TO NON-NATIVE ARTICULATION SCHEMES

CROSS-REFERENCES TO RELATED APPLICATIONS

This application is a continuation-in-part of U.S. patent application Ser. No. 12/021,289 filed Jan. 28, 2008, now U.S. Pat. No. 7,570,264 which is a continuation of U.S. patent application Ser. No. 10/844,048 filed May 11, 2004, now U.S. Pat. No. 7,333,112, which claims priority to and incorporates by reference for all purposes U.S. Provisional Patent Applications "Rig Baking," Ser. No. 60/470,590, "Defrobulation," Ser. No. 60/470,767, both filed May 14, 2003. To incorporate by reference, U.S. patent application Ser. No. 10/844,049 filed May 11, 2004, now U.S. Pat. No. 7,259,764. This application incorporates by reference for all purposes, the above references.

BACKGROUND OF THE INVENTION

The present invention relates to the field of computer graphics, and in particular to methods and apparatus for animating computer generated characters. The present invention relates to the field of computer graphics. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

Computer-generated animation of characters is accomplished by manipulating a three-dimensional model of a character into a series of bodily positions, or poses, over a sequence of frames. A realistic looking character model is often extremely complex, having millions of surface elements and hundreds or thousands of attributes. Due to the complexity involved with animating such complex models, animation tools often rely on armatures and animation variables to define character animation.

An armature is a "stick Fig." representing the character's pose, or bodily position. By moving the armature segments, which are the "sticks" of the "stick Fig.," the armature can be manipulated into a desired pose. As the armature is posed by the animator, the animation tools modify character model so that the bodily attitude of the character roughly mirrors that of the armature.

Animation variables are another way of defining the character animation of a complex character model. Animation variables are parameters for functions that modify the appearance of a character model. Animation variables and their associated functions are used to abstract complicated modifications to a character model to a relatively simple control. Animation variables and their associated functions may manipulate armature segments, thereby altering the appearance of the character model indirectly, or manipulate the character model directly, bypassing the armature.

For example, a single animation variable can define the degree of opening of a character's mouth. In this example, the value of the animation variable may manipulate several different parts of the armature and/or modify portions of the character model directly to create a modified character model having a mouth opened to the desired degree.

The functions associated with animation variables, referred to as model components, can be used to create a variety of realistic and artistic effects. For example, model components can be used to create layers of bones, muscle, and fat beneath the surface of a character model, so that the surface or skin of a character model deforms realistically as it is posed. Model components can also be used to simulate the movement of non-rigid features such as hair and cloth. In addition to replicating specific physical phenomena, model components can be used to manipulate the character model according to an algorithm or procedure, such as sculpted shapes, metaballs, and physics simulations.

Model components can be extremely complex and therefore time-consuming to execute. To create artistically effective character animation, an animator often creates a rough version of a scene and then repeatedly fine-tunes the character animation to create desired drama and expression of the final scene. The time needed to execute model components as animators pose and repose character models hinders the efficiency of the animator. In the worst case, an animator may be forced to use simplified "stand-in" character models to create the initial animation, and then wait to see the resulting animation with the final character model. In this situation, the animator is essentially working blind and can only guess at the final result. Conversely, the additional computing resources needed to process model components in a reasonable time, if even possible, substantially increases the costs of creating animation.

It is therefore desirable for a system and method of optimizing the performance of model components such that they can be executed in a reasonable time without consuming undue computing resources. It is further desirable to be able to optimize any type of model component, regardless of its function or complexity.

BRIEF SUMMARY OF THE INVENTION

Model components can be used to pose character models to create a variety of realistic and artistic effects. An embodiment of the invention analyzes the behavior of a model component to determine a statistical representation of the model component that closely approximates the output of the model component. As the statistical representation of model components execute faster than the original model components, the model components used to pose a character model can be replaced at animation time by equivalent statistical representations of model components to improve animation performance. The statistical representation of the model component is derived from an analysis of the character model manipulated through a set of representative training poses. The statistical representation of the model component is comprised of a weighted combination of posed frame positions added to a set of posing errors controlled by nonlinear combinations of the animation variables.

In an embodiment of the invention, a method of manipulating at least a portion of a character model into a pose using a model component comprises creating a statistical representation, referred to as a baked component, from the model component. The method identifies a portion of the character model associated with the baked component and determines a set of geometrically posed positions of a set of points of the character model from the pose. The method also predicts a set of posing errors associated with the set of points of the character model from the baked component and the pose. Each of the set of posing errors specifies a displacement of a point from a geometrically posed position. The manipulated character model is then formed by applying the set of posing errors to the set of geometrically posed positions of the set of points.

In an additional embodiment, the portion of the character model associated with the pose is identified by at least one reference frame influencing the portion of the character model. Furthermore, an embodiment defines the pose at least in part by a set of animation variables. In yet a further embodiment, animation variables, such as joint rotation angles, are expressed in a defrobulated form. Additionally, the set of posing errors may specify a single displacement of a point or a series of displacements of a point from a geometrically posed position over time.

In another embodiment, the baked component is created from the model component by identifying at least a portion of the character model associated with the model component. This embodiment then manipulates the character model through each of a set of training poses. The set of training poses are defined by a set of inputs and are representative of a range of motion of the character model. From the set of training poses, the embodiment determines a set of training posing errors for at least one point of the character model and then analyzes the set of training posing errors to determine a relationship between the set of inputs and the set of training posing errors. In yet a further embodiment, analyzing the set of posing errors includes performing a regression analysis of the set of training posing errors against the set of inputs.

In a further embodiment of creating a baked component, the set of inputs includes a set of animation variables. A portion of the set of animation variables are joint rotation angles expressed in a defrobulated form. Additionally, each of the set of training posing errors is at least one difference in position of the point of a character model from a geometrically posed position to at least one position specified by the model component. Each of the set of posing errors may specify a single displacement of a point or a series of differences in position over time of the point of the character model from the geometrically posed position to a set of positions over time specified by the model component.

Various embodiments of the present invention disclose methods for determining improved frame weights based upon posing errors. Various embodiments redistribute weights of frame positions and recomputes posing errors. Weights are redistributed when the computed posing errors are reduced. In various embodiments, redistribution may be performed on pairs of weights, however, in other embodiments, other ways to redistribute weights are contemplated.

In various embodiments, once frame positions (coordinate frames) and the frame weights determined, poses are compared to the fully posed and modeled object. Based upon a differences in surface positions, corrective offsets and initial corrective offset weights may be determined. These corrective offsets may be geometrically localized, and improved corrective offset weights are then determined. An export model for the object is then determined based upon the frame positions and the frame weights (the baked model) and the corrective offsets and improved corrective offset weights. In various embodiments, the export model may be provided to remote users. These remote users may use the export model to animate the object for computer animation (e.g. cartoon, feature-length animation), for games (e.g. real-time animation), for crowd simulation environments, or the like.

According to one aspect of the invention, a method for exporting animation data from a native animation environment to animation data for a non-native animation environment a computer system is disclosed. One technique includes determining a first plurality of poses associated with an object in response to a first model for the object in a native animation environment and to a plurality of animation variables associated with the object in the computer system; determining a second model for the object, wherein the second model comprises a geometric model of the object, and determining a second plurality of poses associated with the object in response to the second model for the object and to the plurality of animation variables in the computer system. A process includes determining a plurality of surface errors in response to a comparison between the first plurality of poses and the second plurality of poses in the computer system, determining a plurality of corrective offsets associated with the object in response to the plurality of surface errors in the computer system, and determining a plurality of actuation values associated with the plurality of corrective offsets in response to the plurality of surface errors and to the plurality of corrective offsets in the computer system. A method includes determining a third model for the object compatible with a non-native animation environment in response to the second plurality of poses, the plurality of corrective offsets, and the plurality of actuation values in the computer system, and storing the third model for the object in a memory associated with the computer system.

According to another aspect of the invention, a computer system for exporting animation data from a native animation environment to animation data for a non-native animation environment is disclosed. One apparatus includes a memory configured to store a first model for an object within a native animation environment, and configured to store a plurality of animation variables associated with the object. A device may include a processor is configured to determine a first plurality of poses associated with the object in response to the first model for the object in the native animation environment and to the plurality of animation variables, configured to determine a second model for the object, wherein the second model comprises a geometric model of the object, configured to determine a second plurality of poses associated with the object in response to the second model for the object and to the plurality of animation variables, configured to determine a plurality of surface errors in response to a comparison between the first plurality of poses and the second plurality of poses, configured to determine a plurality of corrective offsets associated with the object in response to the plurality of surface errors in the computer system, configured to determine a plurality of actuation values associated with the plurality of corrective offsets in response to the plurality of surface errors and to the plurality of corrective offsets in the computer system, and configured to determine a third model for the object compatible with a non-native animation environment in response to the second plurality of poses, the plurality of corrective offsets, and the plurality of actuation values. In various embodiments, the memory is also configured to store the third model for the object compatible with the non-native animation environment.

According to another aspect of the invention, a computer program product for exporting animation data from a native animation environment to animation data for a non-native animation environment residing on a tangible medium and executable on a computer system including a processor and a memory is described. The tangible medium may include code that directs the processor to determine a first plurality of poses associated with an object in response to a first model for the object in a native animation environment and to a plurality of animation variables associated with the object in the computer system, code that directs the processor to determine a second model for the object, wherein the second model comprises a geometric model of the object, and code that directs the processor to determine a second plurality of poses associated with the object in response to the second model for the object and to the plurality of animation variables in the computer system. The computer program product may include code that directs the processor to determine a plurality of surface errors in response to a comparison between the first plurality of poses and the second plurality of poses in the computer system, code that directs the processor to determining a plurality of corrective offsets associated with the object in response to the plurality of surface errors in the computer system, and code that directs the processor to determine a plurality of actuation values associated with the plurality of corrective offsets in response to the plurality of surface errors and to the plurality of corrective offsets in the computer system. Executable code may include code that directs the processor to determine a third model for the object compatible with a non-native animation environment in response to the second plurality of poses, the plurality of corrective offsets, and the plurality of actuation values in the computer system, and code that directs the processor to store the third model for the object in the memory associated with the computer system. The codes may reside on a tangible media, e.g. magnetic storage, electronic storage, optical storage, semiconductor storage, or the like.

According to one aspect of the invention, a method for forming an improved model of an object in a computer system is described. One technique include determining a first plurality of poses associated with an object in response to a first model for the object and to a plurality of animation variables associated with the object, wherein the first model comprises a plurality of coordinate frames, determining a plurality of initial coordinate frame weights in response to the plurality of coordinate frames, and the plurality of animation values, and determining a second plurality of poses associated with the object in response to the plurality of coordinate frames, to the plurality of initial coordinate frame weights, and to the plurality of animation variables. A process may include determining a first plurality of surface errors in response to the first plurality of poses and the second plurality of poses, reallocating the plurality of initial coordinate frame weights to form a plurality of revised coordinate frame weights in response to the plurality of surface errors, wherein revised coordinate frame weights from the plurality of initial coordinate frame weights are non-negative and determining a third plurality of poses associated with the object in response to the plurality of coordinate frames, to the plurality of revised coordinate frame weights, and to the plurality of animation variables. A method may include forming a second model for the object in response to the plurality of coordinate frames and to the plurality of revised coordinate frame weights, and storing the second model for the object in a memory of the computer system.

According to another aspect of the invention, a computer system for forming an improved model of an object is disclosed. One device may include a memory configured to store a first model for the object comprising a plurality of coordinate frames, and configured to store a plurality of animation variables associated with the object. An apparatus may include a processor configured to determine a first plurality of poses associated with an object in response to the first model for the object and to the plurality of animation variables associated with the object, configured to determine a plurality of initial coordinate frame weights in response to the plurality of coordinate frames, and the plurality of animation values, configured to determine a second plurality of poses associated with the object in response to the plurality of coordinate frames, to the plurality of initial coordinate frame weights, and to the plurality of animation variables, configured to determine a first plurality of surface errors in response to the first plurality of poses and the second plurality of poses, configured to reapportion the plurality of initial coordinate frame weights to form a plurality of revised coordinate frame weights in response to the plurality of surface errors, wherein revised coordinate frame weights from the plurality of initial coordinate frame weights are non-negative, configured to determine a third plurality of poses associated with the object in response to the plurality of coordinate frames, to the plurality of revised coordinate frame weights, and to the plurality of animation variables, and configured to form a second model for the object in response to the plurality of coordinate frames and to the plurality of revised coordinate frame weights. In various embodiments, the memory is also configured to store the second model for the object in a memory of the computer system.

According to another aspect of the invention, A computer program product for forming an improved model of an object on a tangible medium and executable on a computer system including a processor and a memory is disclosed. The tangible media may include code that directs the processor to determine a first plurality of poses associated with the object in response to a first model for the object and to a plurality of animation variables associated with the object, wherein the first model comprises a plurality of coordinate frames, code that directs the processor to determine a plurality of initial coordinate frame weights in response to the plurality of coordinate frames, and the plurality of animation values, and code that directs the processor to determine a second plurality of poses associated with the object in response to the plurality of coordinate frames, to the plurality of initial coordinate frame weights, and to the plurality of animation variables. The computer program product may include code that directs the processor to determine a first plurality of surface errors in response to the first plurality of poses and the second plurality of poses, code that directs the processor to reallocate the plurality of initial coordinate frame weights to form a plurality of revised coordinate frame weights in response to the plurality of surface errors, wherein revised coordinate frame weights from the plurality of initial coordinate frame weights are non-negative, and code that directs the processor to determine a third plurality of poses associated with the object in response to the plurality of coordinate frames, to the plurality of revised coordinate frame weights, and to the plurality of animation variables. Executable code may include code that directs the processor to form a second model for the object in response to the plurality of coordinate frames and to the plurality of revised coordinate frame weights, and code that directs the processor to store the second model for the object in a memory of the computer system. The codes may reside on a tangible media, e.g. magnetic storage, electronic storage, optical storage, semiconductor storage, or the like.

BRIEF DESCRIPTION OF THE DRAWINGS

The invention will be described with reference to the drawings, in which.

DETAILED DESCRIPTION OF THE INVENTION

Figure 1:
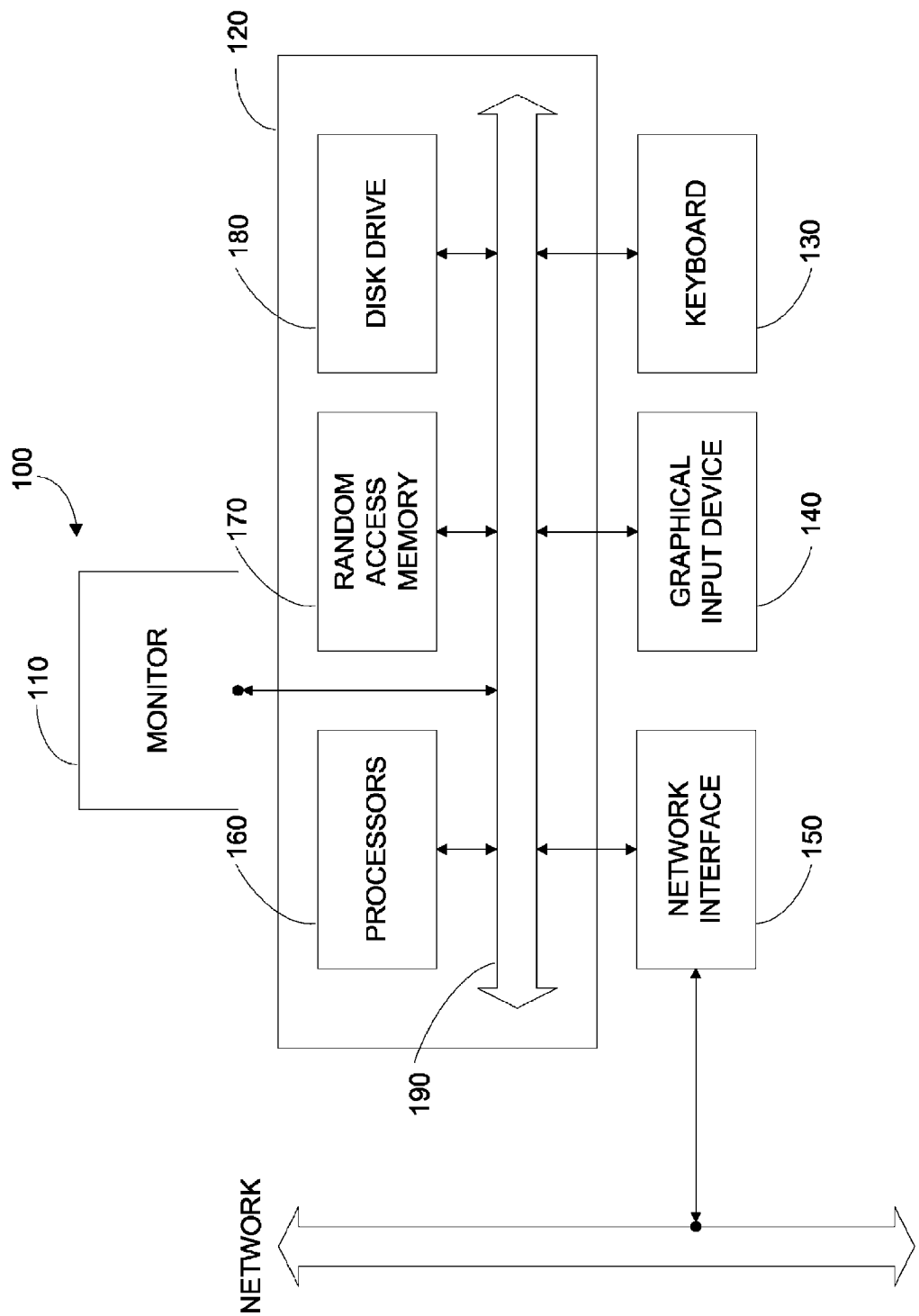
FIG. 1 illustrates a block diagram of a computer system suitable for implementing an embodiment of the invention.

FIG. 1 illustrates a block diagram of a computer system suitable for implementing an embodiment of the invention. FIG. 1 illustrates an example computer system 100 capable of implementing an embodiment of the invention. Computer system 100 typically includes a monitor 110, computer 120, a keyboard 130, a user input device 140, and a network interface 150. User input device 140 includes a computer mouse, a trackball, a track pad, graphics tablet, touch screen, and/or other wired or wireless input devices that allow a user to create or select graphics, objects, icons, and/or text appearing on the monitor 110. Embodiments of network interface 150 typically provides wired or wireless communication with an electronic communications network, such as a local area network, a wide area network, for example the Internet, and/or virtual networks, for example a virtual private network (VPN).

Computer 120 typically includes components such as one or more general purpose processors 160, and memory storage devices, such as a random access memory (RAM) 170, disk drives 180, and system bus 190 interconnecting the above components. RAM 170 and disk drive 180 are examples of tangible media for storage of data, audio/video files, computer programs, applet interpreters or compilers, virtual machines, embodiments of the herein described invention including geometric scene data, object data files, shader descriptors, a rendering engine, output image files, texture maps, and displacement maps. Further embodiments of computer 120 can include specialized audio and video subsystems for processing and outputting audio and graphics data. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices.

Figure 2:
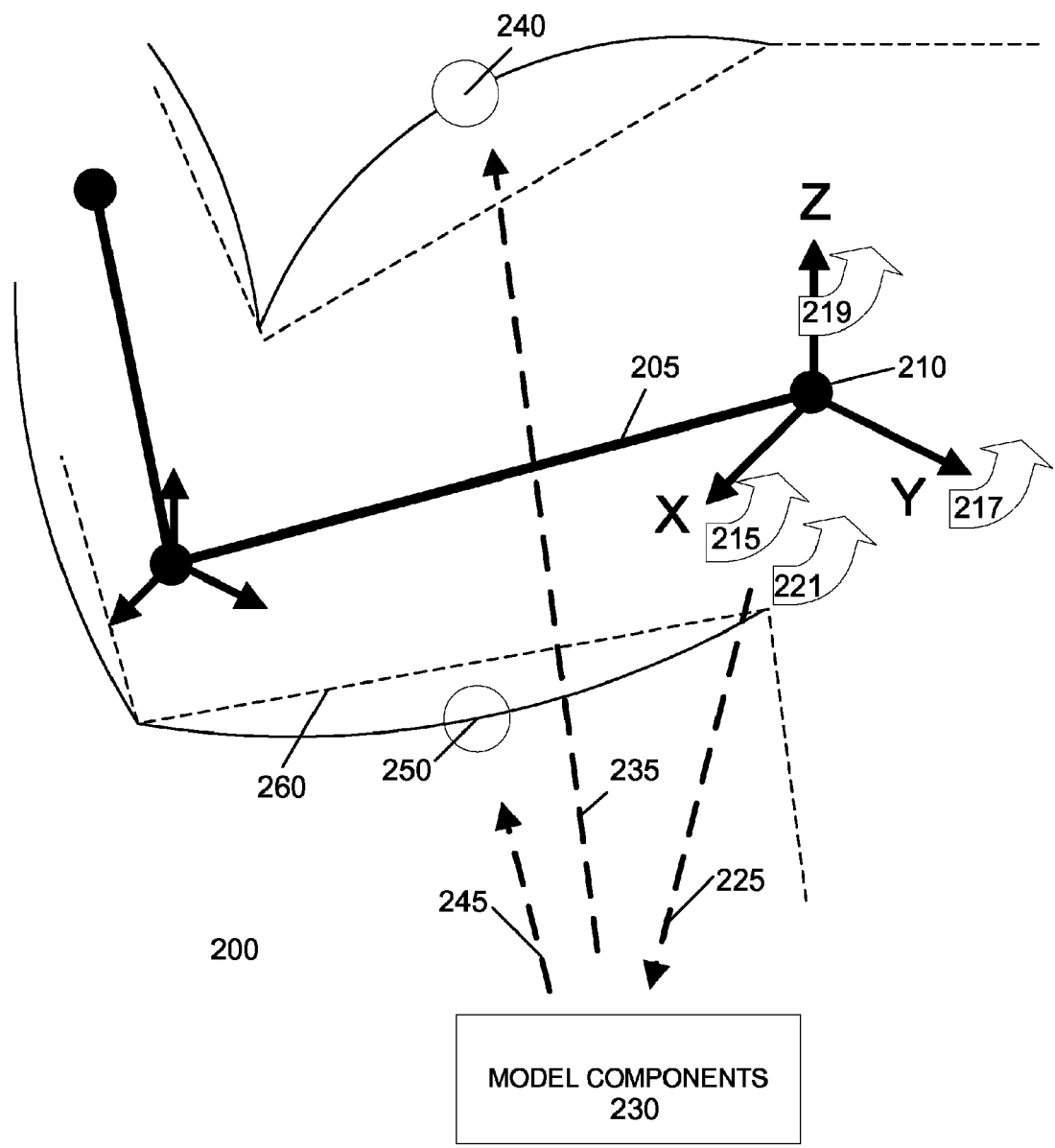
FIG. 2 illustrates a prior use of model components to determine the posed position of points on an articulated character model.

FIG. 2 illustrates a prior use of model components to determine the posed position of example points on an articulated character model 200. FIG. 2 illustrates a portion of the shoulder and arm region of character model 200. In an embodiment, character model 200 is a three-dimensional computer model of an object, although it is shown in two dimensions in the Figs. for clarity. Additionally, although character model 200 is shown to be humanoid in shape, character model 200 may take the form of any sort of object, including plants, animals, and inanimate objects with realistic and/or anthropomorphic attributes.

Character model 200 can be created in any manner used to create three-dimensional computer models, including manual construction within three-dimensional modeling software, procedural object creation, and three-dimensional scanning of physical objects. Character model 200 can be comprised of a set of polygons; voxels; higher-order curved surfaces, such as Bezier surfaces or non-uniform rational B-splines (NURBS); constructive solid geometry; and/or any other technique for representing three-dimensional objects. Additionally, character model 200 can include attributes defining the outward appearance of the object, including color, textures, material properties, transparency, reflectivity, illumination and shading attributes, displacement maps, and bump maps.

Character model 200 is animated through armature 205. Armature 205 includes one or more armature segments. In FIG. 2, the armature 205 are used to represent the pose of the upper arm of the character model 200. Animators manipulate the position and orientation of the segments of armature 205 to define a pose for the character model 200.

Armature segments can be constrained in size, position, or orientation, or can be freely manipulated by the animator. The number of armature segments can vary according to the complexity of the character, and a typical character can have an armature with hundreds or thousands of segments. In some cases, the number and position of armature segments is similar to that of a "skeleton" for a character; however, armature segments can also define subtle facial expressions and other character details not necessarily associated with bones or other anatomical features. Additionally, although the armature segments in the armature 205 of FIG. 2 are comprised of a set of line segments, in alternate embodiments of the invention the armature segments can be comprised of a set of surfaces and/or a set of volumes.

Character model 205 is animated by creating a sequence of frames, or still images, in which the character model 200 is progressively moved from one pose to another. Character model 200 can also be translated, rotated, scaled, or otherwise manipulated as a whole between frames. Animators can manually create the poses of a character model 200 for each frame in the sequence, or create poses for two or more key frames, which are then interpolated by animation software to create the poses for each frame. Poses can also be created automatically created using functions, procedures, or algorithms.

Whether all or a portion of a pose is created manually by an animator or automatically using a function, procedure, or algorithm, the pose of character model 200 can be defined by a set of animation variables. One type of animation variable specifies the rotation angles of an armature segment around an origin, referred to as a joint. In FIG. 2, the upper arm segment of armature 205 is rotated around joint 210. The rotation of the upper arm segment of the armature 205 around joint 210 is specified by animation variables 215, 217, 219, and 221. In this example, each of the animation variables 215, 217, 219, and 221 specifies a rotation about a coordinate axis.

The position of points of character model 200 are determined, at least in part, by model components 230. In an embodiment, animation variables 225, which may include animation variables 215, 217, 219, and 221 associated with joint 210, are input into the model components 230. Model components 230 then determines the position of one or more points of the character model 200 from the inputted animation variables. Model components 230 can employ any type of data processing function, procedure, or algorithm to determine the position of points of the character model 200, including but not limited to simulations of skin, bone, fat and muscle layers; dynamic cloth simulations; sculpted shapes; metaballs; and physics simulations. Model components can be used to determine the configuration of geometry or other attributes of character model 200 for points on the surface of the character model, points within the interior of character model 200, and/or points outside of character model 200.

In FIG. 2, model components 230 determine the position of points 240 and 250 of character model 200. The output 235 of model components 230 specifies the position of point 240. Similarly, the output 245 of model components 230 specifies the position of point 250. The positions of points 240 and 250 can be specified by model components 230 in terms of a displacement from the character model 200 in a base or rest position.

Alternatively, portions of the character model can be rotated in accordance with nearby armature segments to form a geometrically posed character model 260. A geometrically posed character model uses one or more geometric operations to transform from a rest or unposed orientation to a posed orientation. Geometric operations include translation, scaling, rotation, and other similar manipulations of portions of the character model, as well as the weighted or unweighted combination of these operations. Geometric operations can also include projecting points of a character model from the surface of the character model. The outputs 235 and 245 of model components 230 in turn specify a further displacement of points 240 and 250 from their positions on the geometrically posed character model 260. As discussed in detail below, regardless of how the model component specifies the position of points on the character model, a baked component in conjunction with a geometrically posed character model can be used to approximate the model component.

The complexity of many types of model components makes posing a character model time-consuming and computationally expensive. As discussed above, this hinders the ability of the animator to fine-tune character animation to produce the desired drama and expression. An embodiment of the invention optimizes the performance of model components by creating a statistical representation of each model component used to pose an character model. The statistical representation of the model component, referred to as a baked component, closely approximates the behavior of the model component with a greatly reduced execution time. Furthermore, a baked component can be used to approximate the behavior of any type of model component. Thus, the model components used to pose a character model can be replaced by equivalent baked components, thereby improving execution performance and reducing the computational resources needed in posing character models.

Figure 3:
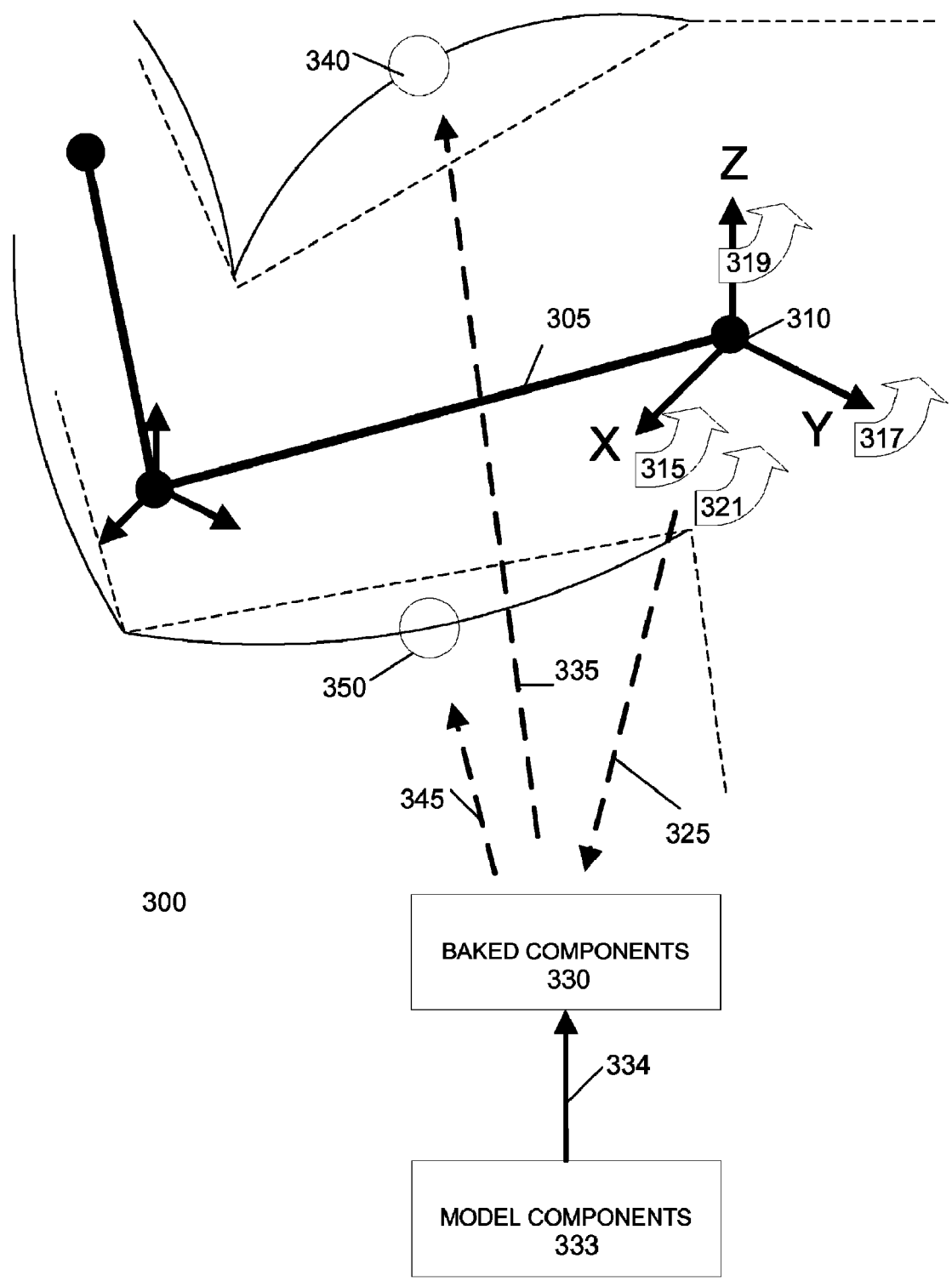
FIG. 3 illustrates the use of baked components to determine the posed position of a point on an articulated character model according to an embodiment of the invention.

FIG. 3 illustrates the use of baked components to determine the posed position of a point on an articulated character model according to an embodiment of the invention. Character model 300 is animated through armature 305, which in FIG. 3 represents the pose of the upper arm of the character model 300. Animators manipulate the position and orientation of the segments of armature 305 to define a pose for the character model 300.

The pose of character model 300 can be defined by a set of animation variables, including animation variables 315, 317, 319, and 321, which specify the rotation of an upper arm segment of the armature 305 around a joint 310. The position of points of character model 300 can be determined, at least in part, by model components 333. However, an embodiment of the invention decreases the execution time need to create a posed character model by replacing the model components 333 with a corresponding set of baked components 330 approximating the behavior of the model components 333. The baked components 330 are derived 334 from the model components 333. The baked components 330 can approximate any type of data processing function, procedure, or algorithm to determine the position of points of the character model 300, including but not limited to simulations of skin, bone, fat and muscle layers; dynamic cloth simulations; sculpted shapes; metaballs; and physics simulations.

In an embodiment, the baked components 330 can be derived the model components 333 in advance of the posing of the character model 300. Further, once derived from the model components 333, the baked components 330 can be used repeatedly to determine multiple poses of a character model 300.

In an embodiment, animation variables 325, which may include animation variables 315, 317, 319, and 321 associated with joint 310, are input into the baked components 330. Baked components 330 then determine the position of one or more points of the character model 200 from the inputted animation variables 325.

In FIG. 3, baked components 330 determine the position of points 340 and 350 of character model 300. The output 335 of model components 330 specifies the position of point 340. Similarly, the output 345 of model components 330 specifies the position of point 350. The positions of points 340 and 350 can be specified by model components 230 in terms of a displacement from the character model 300 in a base or rest position or alternatively as a displacement of points 340 and 350 from their positions on the geometrically posed character model 360.

Figure 4:
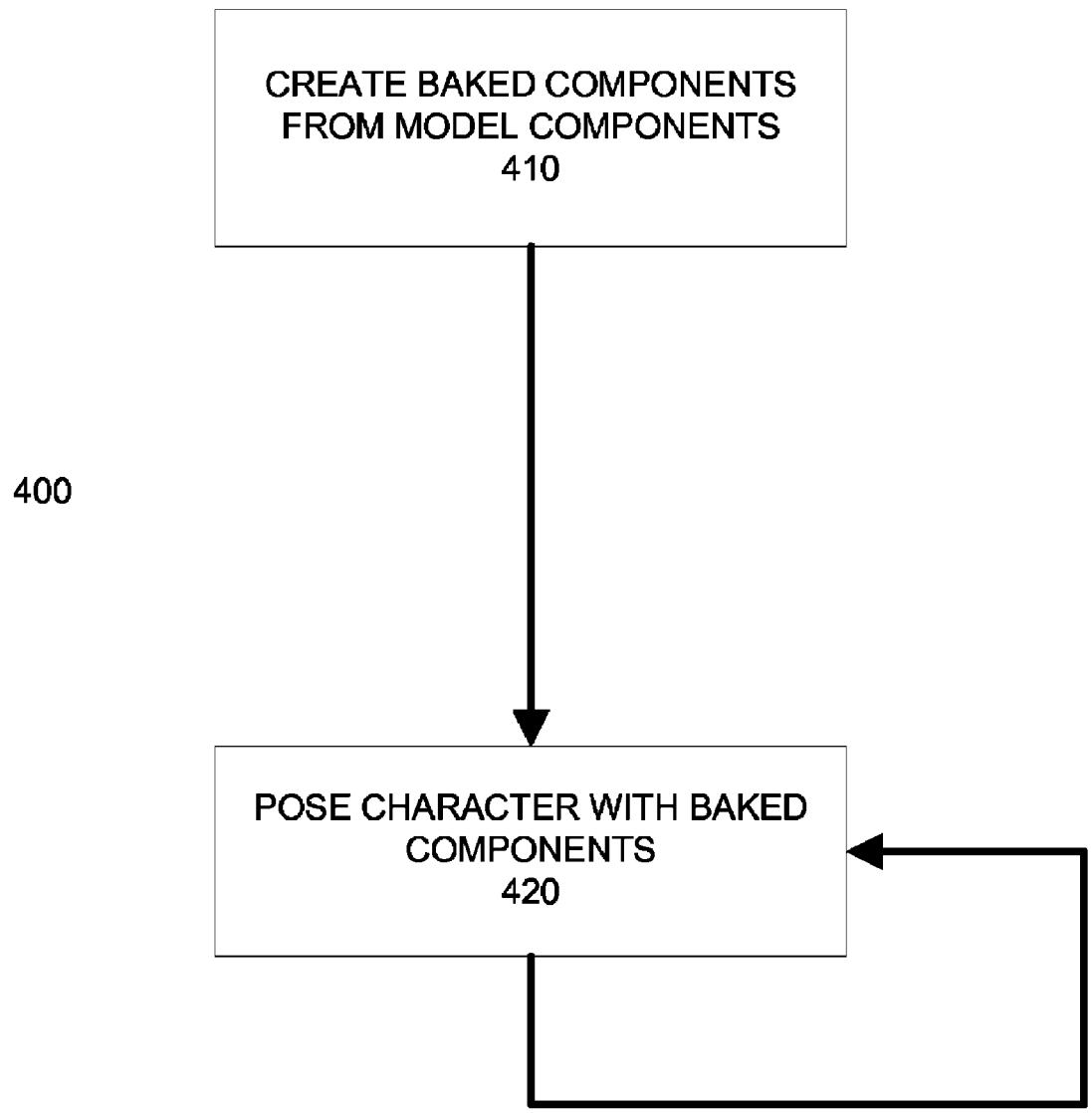
FIG. 4 illustrates two phases of a method for creating a posed character model according to the embodiment of the invention.

As discussed above, baked components can be derived from model components prior to posing the character model. Additionally, once the baked components have been computed, the character model can be repeatedly posed using the baked components. Thus, FIG. 4 illustrates two phases of a method 400 for creating a posed character model according to the embodiment of the invention. In the first phase 410, the baked components are derived from the model components in advance of posing the character model. Following the creation of the baked components, a posed character model can be created using the baked components in the second phase 420. An embodiment of the invention can repeat the second phase 420 to generate additional poses of the character model without re-creating the baked components.

Figure 5:
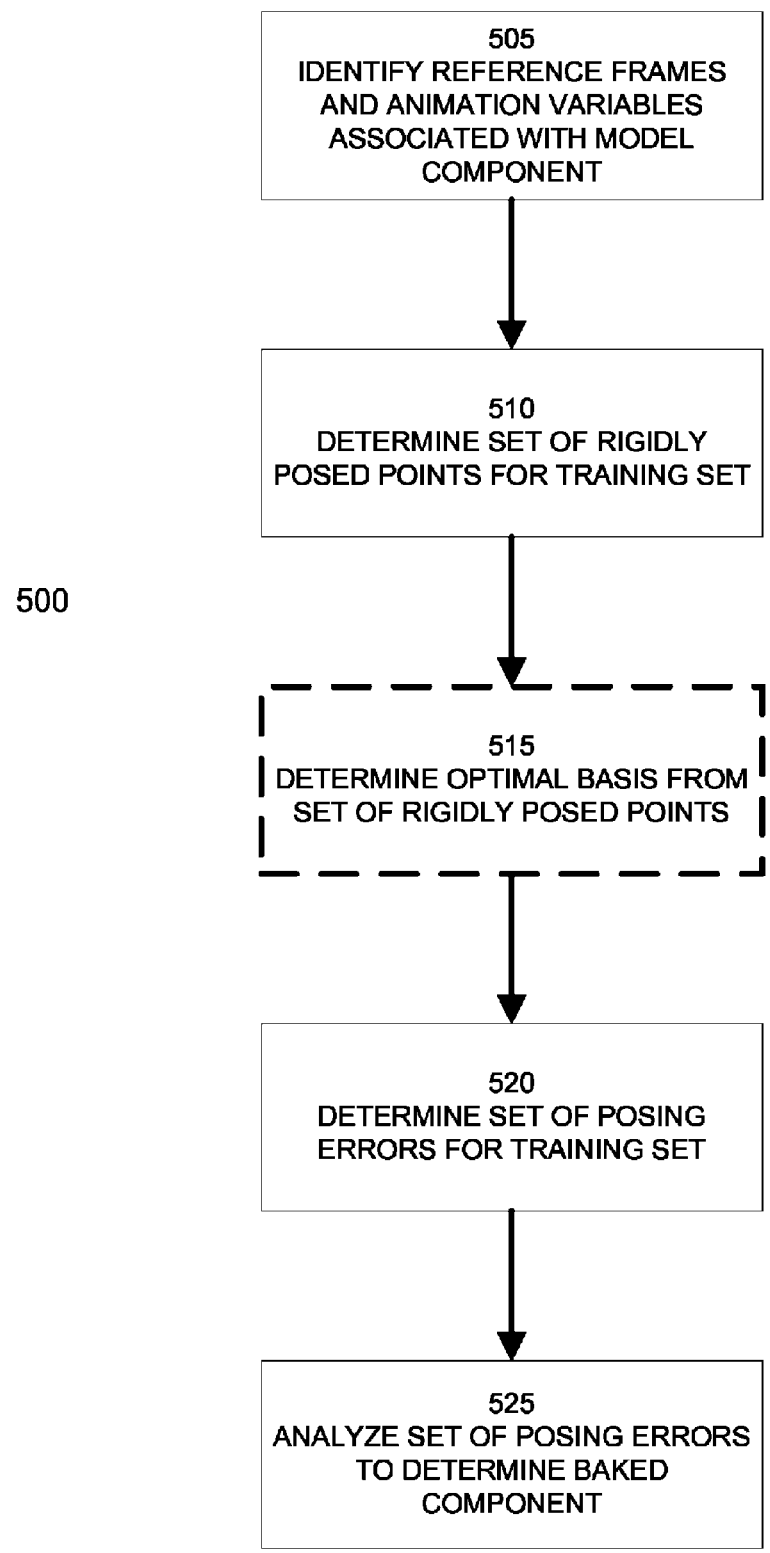
FIG. 5 illustrates a method for creating a baked component from a model component associated with an articulated character model according to an embodiment of the invention.

In an embodiment of the first phase 410, the baked components are created by analyzing the character model in set of training poses, referred to as a training set. FIG. 5 illustrates a method 500 for creating a baked component from a model component associated with an articulated character model according to an embodiment of the invention.

Step 505 identifies the set of animation variables and reference frames associated with the model component. The identified animation variables are the portion of the set of animation variables used to pose the character model that are inputted to the model component. The reference frames define regions of the character model affected by the outputs of the model component. In an embodiment, each reference frame defines a local coordinate system for one or more armature segments and the adjacent portions of the character model. For the set of reference frames associated with the model component, one frame is selected as a parent frame.

In an embodiment, a coordinate reference frame is composed of four vectors: a first vector defining the origin or location of the coordinate reference frame and three vectors defining the coordinate axes of the coordinate reference frame. Each of the points of the character model are associated with one or more reference frames via a set of reference frame weights. A set of reference frame weights defines a weighted average of the influence of the motion of one or more reference frames on a given point. In an embodiment, the associated reference frames and animation variables are determined manually. Alternatively, an analysis of the model component can determine the animation variables used as inputs and the set of points of the character model, and hence the reference frames, potentially affected by its outputs.

Figure 6A:
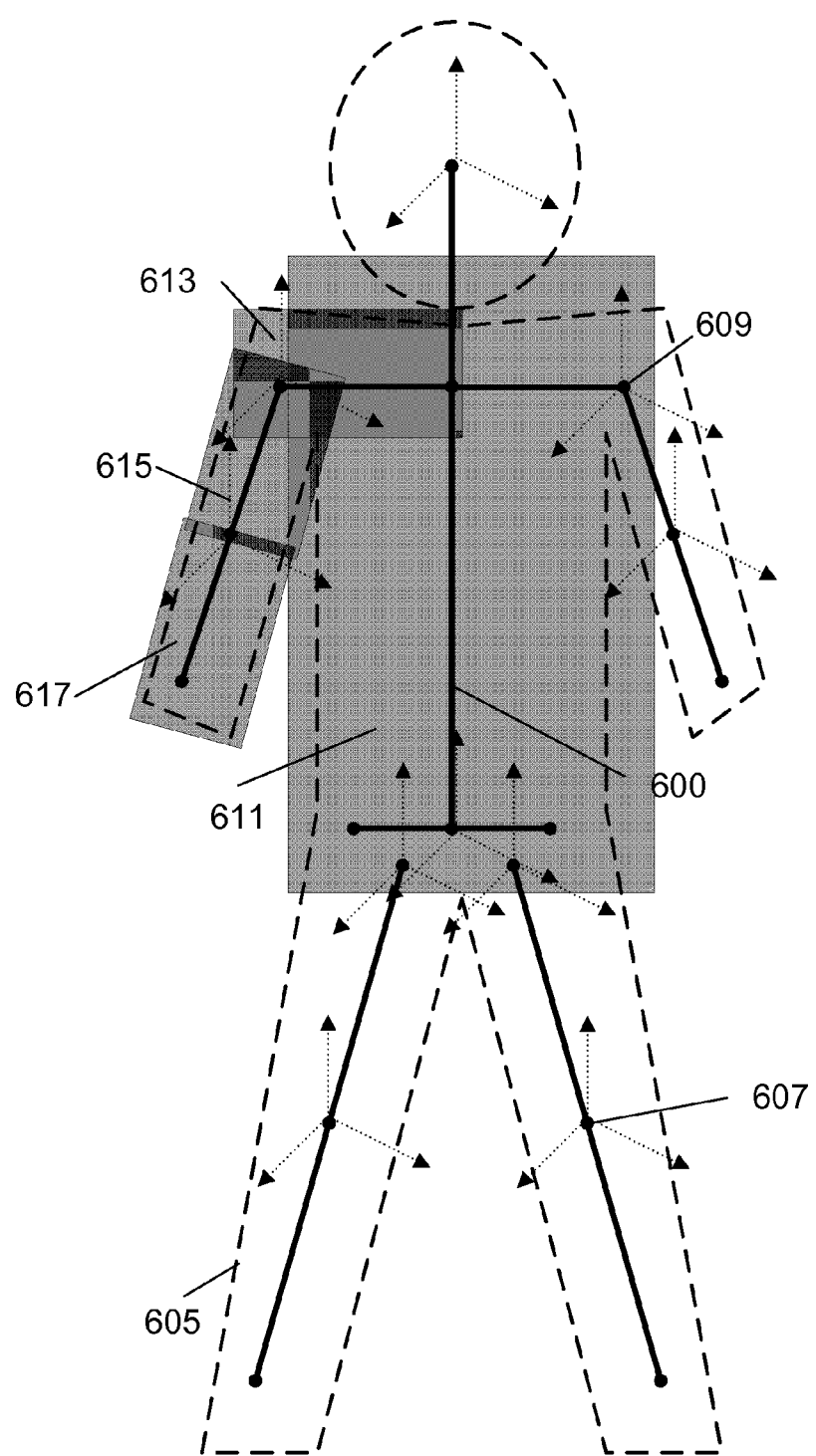
FIGS. 6A-6C illustrate an example application of a method for creating a baked component from a model component associated with an example articulated character model according to an embodiment of the invention.
Figure 6B:
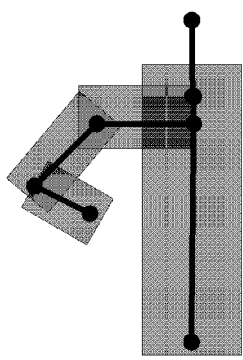
Figure 6B:
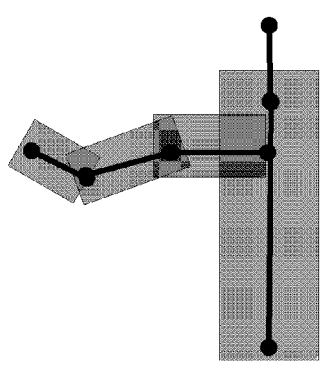
Figure 6B:
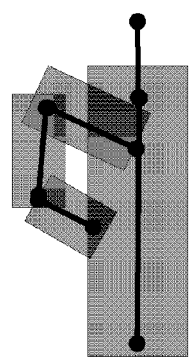
Figure 6B:
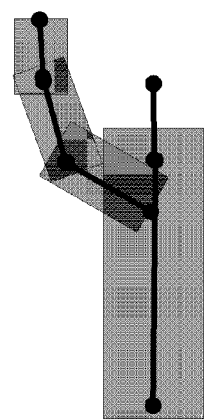
Figure 6B:
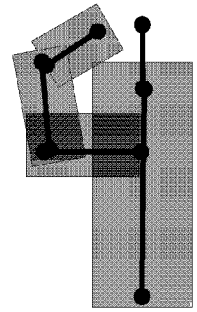
Figure 6B:
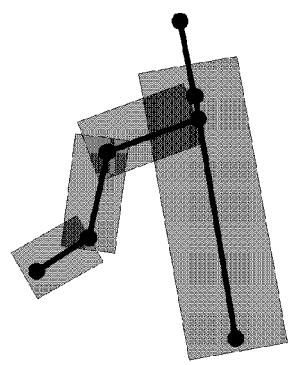
Figure 6C:
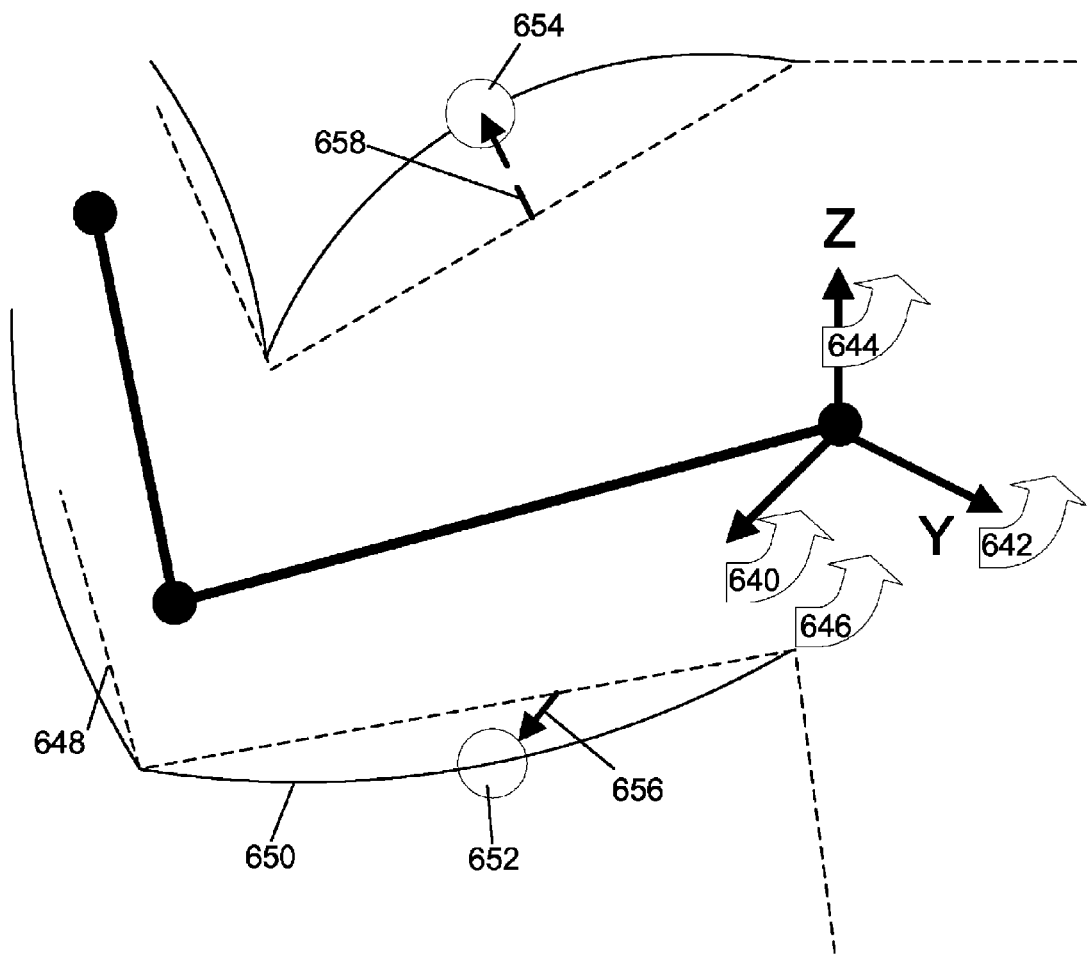

FIGS. 6A-6C illustrate an example application of a method for creating a baked component from a model component associated with an example articulated character model according to an embodiment of the invention. FIG. 6A illustrates an example character armature 600 used in posing a character model 605. Armature 600 includes a number of reference frames, such as reference frame 607 associated with the lower right leg of the armature 600 and reference frame 609 associated with the right shoulder of armature 600. Each reference frame is associated with one or more armature segments and the adjacent portions of the character model 605. For example, reference frame 611 is associated with the torso region of the character model 605, reference frame 613 is associated with the left shoulder area of the character model 605, and reference frames 615 and 617 are associated with the upper and lower left arm, respectively, of the character model 605.

In step 505, the reference frames and animation variables associated with a model component are identified. For example, a muscle deformation model component used to determine the deformation of the arm of character model 605 may be associated with the set of reference frames 611, 613, 615, and 617 and with the animation variables used to pose armature segments within these reference frames.

At step 510, the character model is posed according to a set of training poses. Each training pose is the result of the set of identified animation variables set to example values. The set of training poses ideally covers the normal range of motion for the portion of the character model associated with the model component. In an embodiment, the number of poses in the training set corresponds to at least the number of different reference frames associated with the model component, if not more. In an embodiment, a typical character model may have a training set including several thousands poses.

In an embodiment, the points of the character model are geometrically posed for each pose of the training set. The motion or posing of portions of the character armature also moves the associated reference frames. A geometric pose moves the points of the character model according to the posed position of the associated reference frames, without any displacement from the model component. Step 510 records the values of the animation variables and the corresponding positions of the points of the character model potentially affected by the model component for each training pose. In an embodiment, the posed positions of character model points is expressed in each of the set of reference frames. The set of animation variable values and corresponding positions of character model points comprises a set of sample data.

Continuing with the example of FIG. 6A, FIG. 6B illustrates an example set of training poses 620 for a set of reference frames and animation variables associated with the left arm of a character model as called for by step 510. The training set 620 includes training poses 622, 624, 626, 628, 630, and 632, each of which manipulates the portion of the character model associated with the model component into a different pose. In an example application of step 510, the values of the animation variables and geometrically posed points of the character model for each training pose are recorded to form a set of sample data.

Step 515 analyzes the set of sample data to determine an optimal set of frame basis functions. The portion of the set of set of sample data expressing the posed position of points is combined to form a matrix, and a single value decomposition of this matrix is calculated to find a set of frame basis functions for the set of sample data. In alternate embodiments, other methods of calculating a set of frame basis functions, such as a canonical correlation, can also be used. The set of frame basis functions can be used to express the position of model points optimally in the sample set in a least squares sense. Determining an optimal set of frame basis functions allows the set of sample data to be expressed more compactly, thereby minimizing the amount of data to be analyzed in subsequent steps of method 500. In an embodiment, step 515 decomposes the set of sample data using the set of frame basis functions to determine an optimized set of sample data. However, step 515 is optional and an alternate embodiment of method 500 bypasses step 515 and performs subsequent steps on the original set of sample data.

Step 520 determines a set of posing errors from the optimized set of sample data. In an embodiment, posing errors for a given pose are determined by comparing the geometrically posed positions of the points of the character model with their corresponding positions output from the model component for the same set of animation variables. The posing error for a character model point in a given pose is the difference between the position of the point output by the model component and the geometrically posed position. In a further embodiment, the position of points output from the model component changes over time. In this embodiment, the posing error for a point in a given training pose is a series of differences between the model component output over time and the point's geometrically posed position. For each training pose in the training set, the posing error is determined for each point of the character model potentially affected by the model component.

In another embodiment, the geometrically posed character model defines the position of the "skin" of the character model. The model component defines a position of points relative to this skin. For example, a cloth simulation model component may define the position of points on a character model's clothing relative to the skin of the character model. In this embodiment, the geometrically posed character model defines the direction or orientation of the posing error, and the output of the model component defines a posing error along this orientation.

In an embodiment, the set of frame weights is used to represent the posing error for each point. The posing error for each point is transformed to the parent reference frame selected in step 505. From the parent reference frame, the posing error for each point is weighted according to the set of reference frame weights associated with the point and transformed from the parent reference frame to each reference frame according to the frame basis functions determined in step 515. By transforming and distributing the posing error from the parent reference frame to the other reference frames, the posing error associated with each point of the character model will move with its associated reference frames.

Continuing with the example of FIGS. 6A and 6B, FIG. 6C illustrates the determination of the posing error for an example training pose. Animation variables defining the training pose, including animation variables 640, 642, 644, and 646, are input into the model component to determine the posed character model 650. The position of points of the character model, including points 652 and 654, are compared with their corresponding positions on the geometrically posed character model 648. The posing errors 656 and 658 are the differences in positions between points 652 and 654, respectively, on the posed character model 650 and the geometrically posed character model 648.

Step 525 analyzes the complete set of posing errors to determine the baked component closely approximating the behavior of the model component. In an embodiment, a statistical regression analysis is used to determine the posing error for the points of character model as a function of the animation variables. In one implementation, a nonlinear quadratic regression analysis is performed on the set of posing errors. In this implementation, the animation variables are split into positive and negative values, referred to as split animation variables, and considered as separate regression steps. In a further implementation, if a positive split animation variable falls below zero, the value is clamped to zero. Similarly, a negative split animation is clamped to zero if it goes above zero. In a further embodiment, the split animation variables, the square root of the split animation variables, and the square root of the product of adjacent split animation variables, which are animation variables associated with the same joint, are all used in the regression analysis to determine a function approximating the output of the model component.

In a further embodiment, animation variables representing joint rotations are converted to a defrobulated form to prevent the appearance of visual discontinuities. Unlike typical angle representations, the defrobulated angles do not have any angular discontinuities within the normal range of joint motion. In some applications, defrobulated angles typically exhibit a higher degree of statistical correlation with the output of model components, for example due to defrobulated angles lacking gimbal lock and being continuous over the normal range of joint motion. The conversion of joint angles from a four angle extended Euler form to a corresponding defrobulated format is described in detail in the related provisional and utility applications, "Defrobulation" and "Defrobulated Angles for Character Joint Representation", attorney docket numbers 21751-000900US and 21751-000910US.

In summary of the defrobulated angle format, a joint rotation represented as a standard four angle rotation (tw, a, b, c), corresponding to the right-handed angle rotation form (x, y, z, x), is converted to a set of projections xp=cos(a) cos(b); yp=cos(c) sin(a)+sin(c)sin(b)cos(a); and zp=sin(c) sin(a)−cos(c)sin(b)cos(a). From the set of projections, xp, yp, and zp, a chord angle ch is defined as ch=a cos(xp). The chord angle ch is used as an intermediate value to determine a set of defrobulated angles (q, r, et). In an embodiment, q=ch*yp and r=ch*zp. The essential twist, et, is defined as:

$$et = tw + \arctan\left(\frac{zp}{yp}\right) + \arctan\left(\frac{\sin(b)}{\cos(b)\sin(a)}\right).$$

In its application to an embodiment of the present invention, animation variables representing joint rotations and not already in defrobulated form are converted into a defrobulated form as described above. The regression analysis is then performed using the defrobulated form of animation variables. In a further embodiment, the defrobulated animation variables are split into positive and negative values and considered as separate regression steps. In addition, defrobulated animation variables, their square roots, and the square roots of the products of adjacent animation variables can be included in the regression analysis.

The baked component determined in method 500 can be used in place of the model component in posing the character model for any desired pose, regardless of whether the desired pose was included in the training set. Furthermore, the output of several baked components can be combined to determine the pose of all or one or more portions of a character model.

Figure 7:
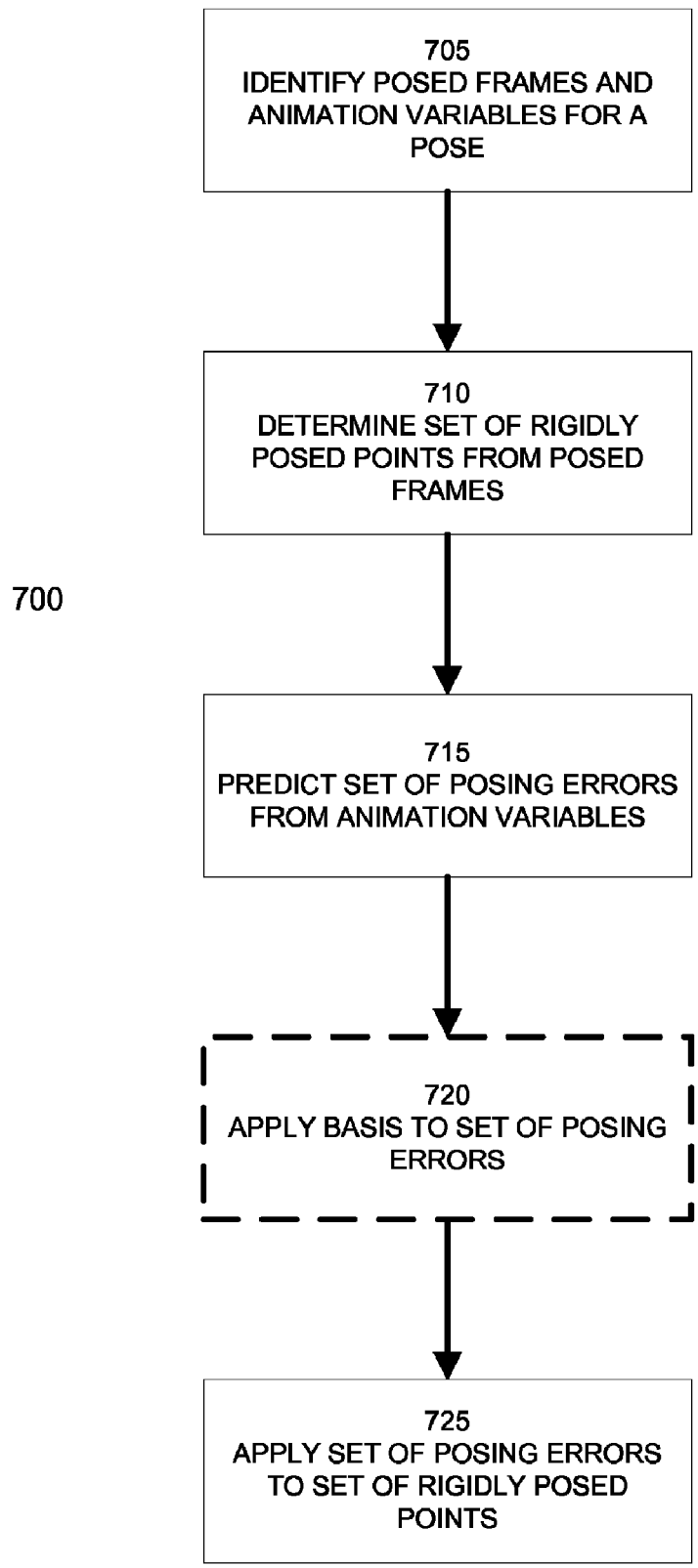
FIG. 7 illustrates a method for determining the posed position of a point on an articulated character model from a baked component according to an embodiment of the invention.

FIG. 7 illustrates a method 700 for determining the posed position of points on an articulated character model from a baked component according to an embodiment of the invention. For a desired character model pose, which in an embodiment can be defined by a set of animation variables, step 705 determines portion of the set of animation variables associated with the baked component. In an embodiment, the portion of the set of animation variables, referred to as the associated animation variables, are those animation variable having a statistical correlation with the output of baked component. Additionally, step 705 determines the reference frames associated with the baked component.

Figure 8A:
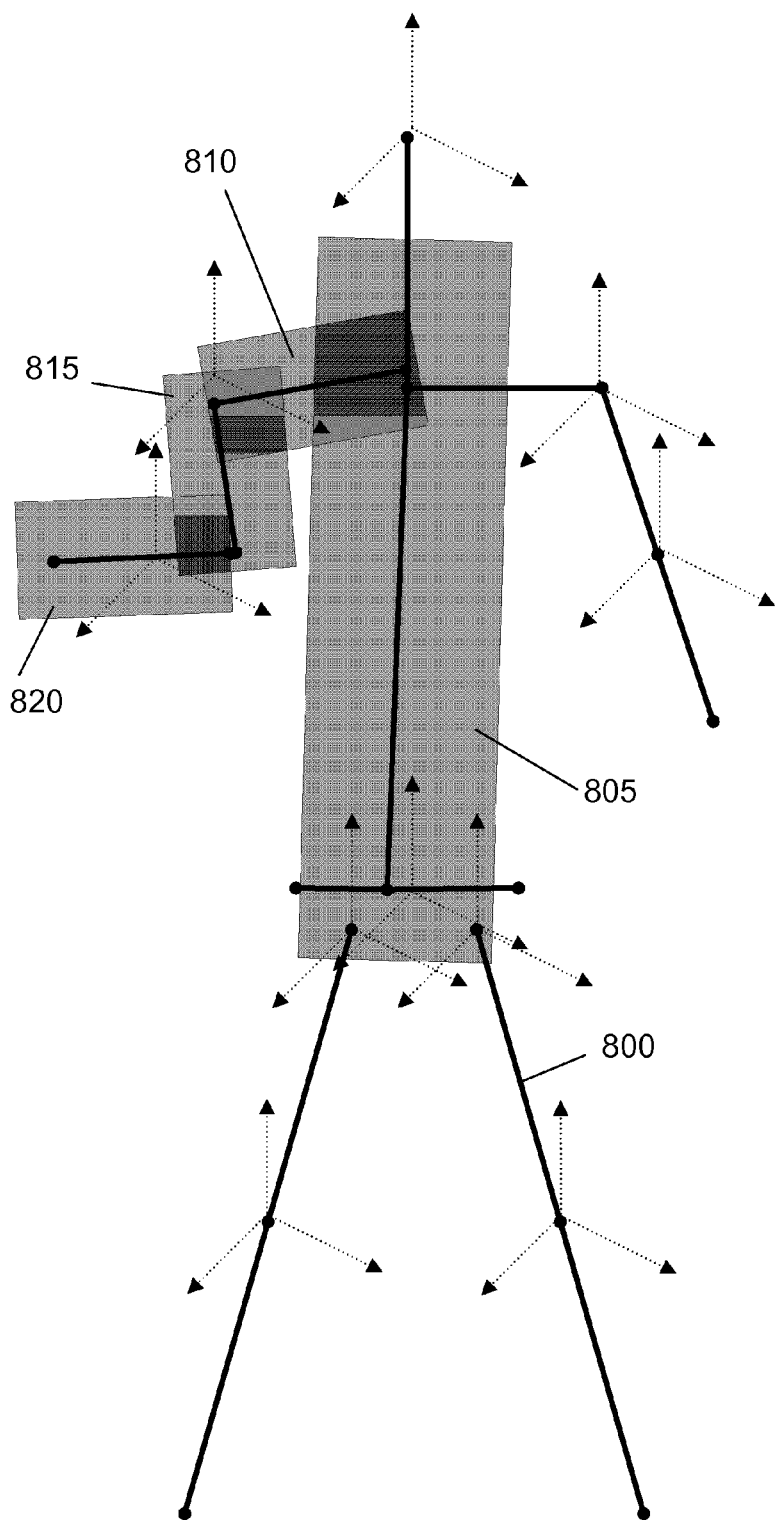
FIGS. 8A-8C illustrate an example application of a method for determining the posed position of a point on an articulated character model from a baked component according to an embodiment of the invention.
Figure 8B:
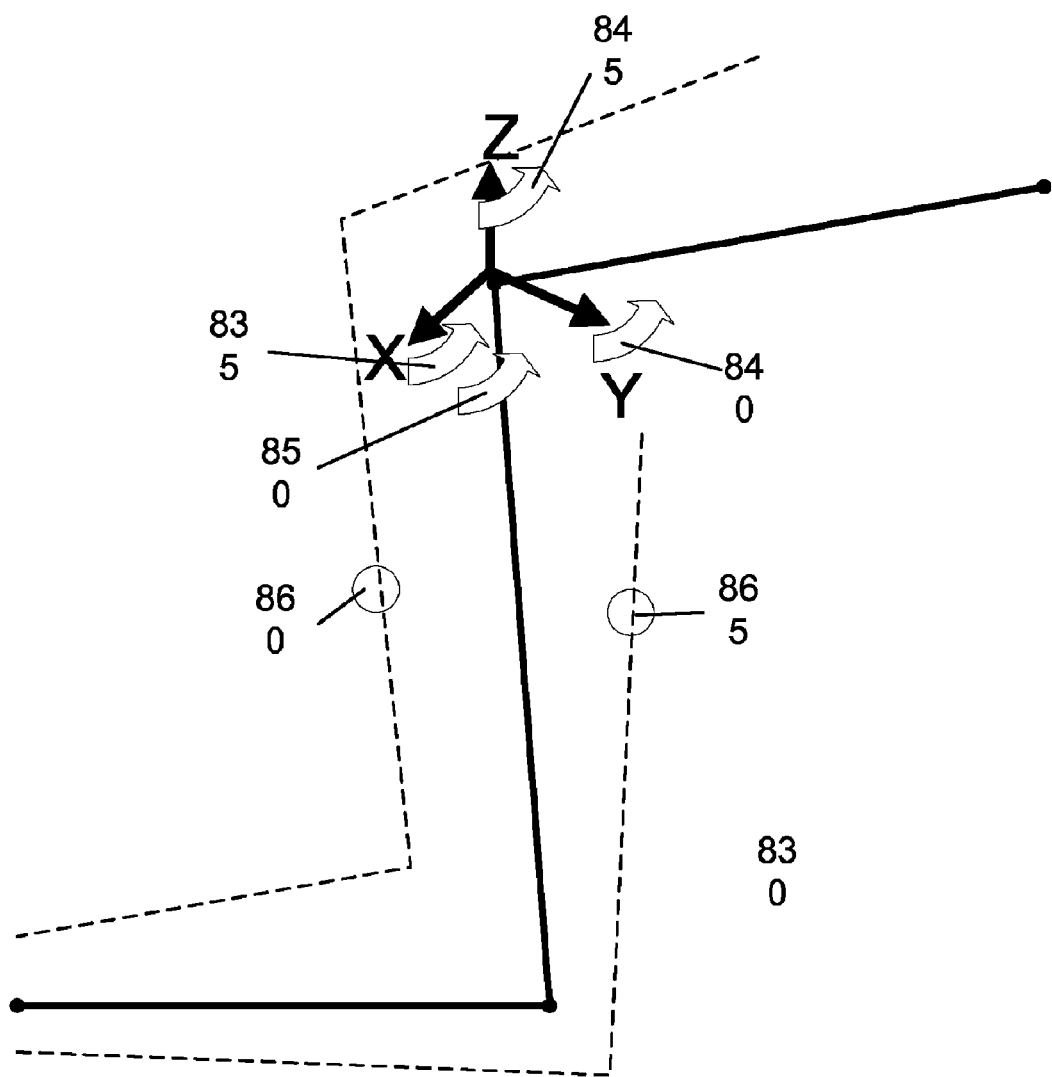
Figure 8C:
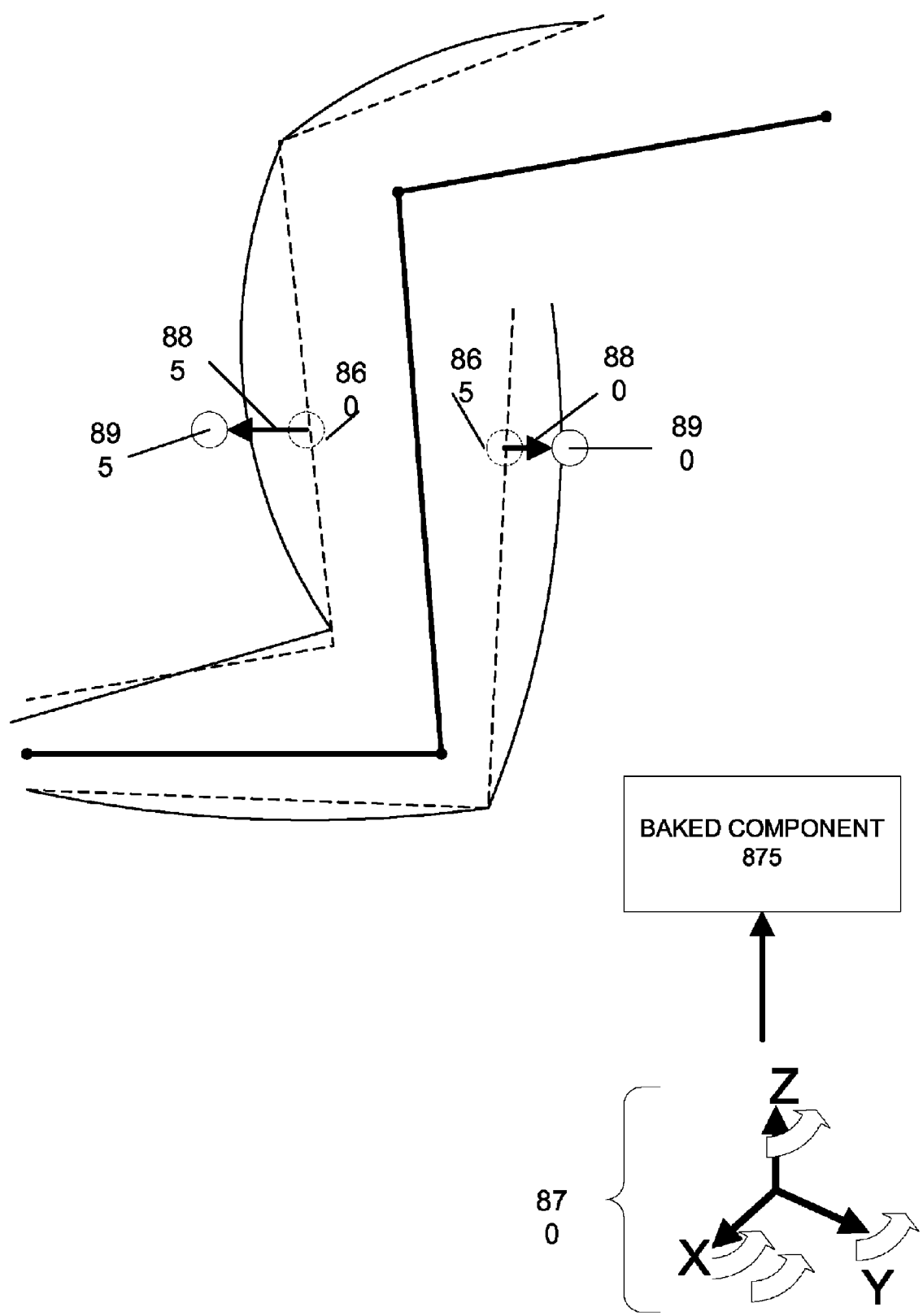

FIGS. 8A-8C illustrate an example application of a method for determining the posed position of a point on an articulated character model from a baked component according to an embodiment of the invention. In the example of FIGS. 8A-8C, the baked component represents the operation of a muscle deformer used to determine the deformation of the left arm of character model for a desired pose. FIG. 8A illustrates the selection of a set of reference frames associated with an example baked component for a desired pose as called for by an embodiment of step 705. Character armature 800 has been manipulated into a desired pose according to a set of animation variables. Step 705 identifies a portion of the set of animation variables associated with the baked component. Additionally, the reference frames, such as reference frames 805, 810, 815, and 820, affected by the baked component are also selected.

At step 710, the character model, or alternately the portions of the character model potentially affected by the baked component, is geometrically posed according to the associated animation variables. Character models can be geometrically posed in any manner known in the art.

FIG. 8B illustrates the determination of the geometrically posed positions of points of the character model as called for by an embodiment of step 710. In FIG. 8B, step 710 poses the portion of the character model 830 affected by the baked component according to the portion of the set of animation variables, including animation variables 835, 840, 845, and 850. The result of the application of the portion of the set of animation variables is a geometrically posed character model 855. Geometrically posed character model includes points 860 and 865.

Additionally, step 715 inputs the associated animation variables into the baked component. For animation variables corresponding with joint angles, an embodiment converts the animation variables to a defrobulated form to be input into the baked component. The output of the baked component is a posing error for at least one point on the character model for the desired pose. In an embodiment, the baked component outputs a series of posing error values representing the posing error over a period of time for at least one point on the character model.

If a set of optimal set of frame basis functions was used to reduce the size of the set of sample data in creating the baked component, then step 720 applies the set of frame basis functions to the posing error associated with each point of the character model. As a result, the posing error is decomposed into its component values in the associated reference frames.

Step 725 adds the posing error for each point to the position of the point on the geometrically posed character model and combines results into a posed character model. The posed character model resulting from the use of the baked component closely approximates the result produced from the original model component for the same set of animation variables.

FIG. 8C illustrates the application of posing errors output by the baked component to the geometrically posed positions of points of the character model as called for by an embodiment of steps 715-725. The portion of the set of animation variables 870 is input into the baked component 875 to produce a set of posing errors, including posing errors 880 and 885. The set of posing errors used to displace points of the geometrically posed character model, including points 860 and 865, to new positions, such as 895 and 890, respectively. The new positions of the points of the character model closely approximate the positions resulting from the application of the original model component.

It should be noted that once the posed or deformed model has been created using one or more of the above discussed embodiments, any rendering technique, for example ray-tracing or scanline rendering, can create a final image or frame from the model in combination with lighting, shading, texture mapping, and any other image processing information.

Figure 9A:
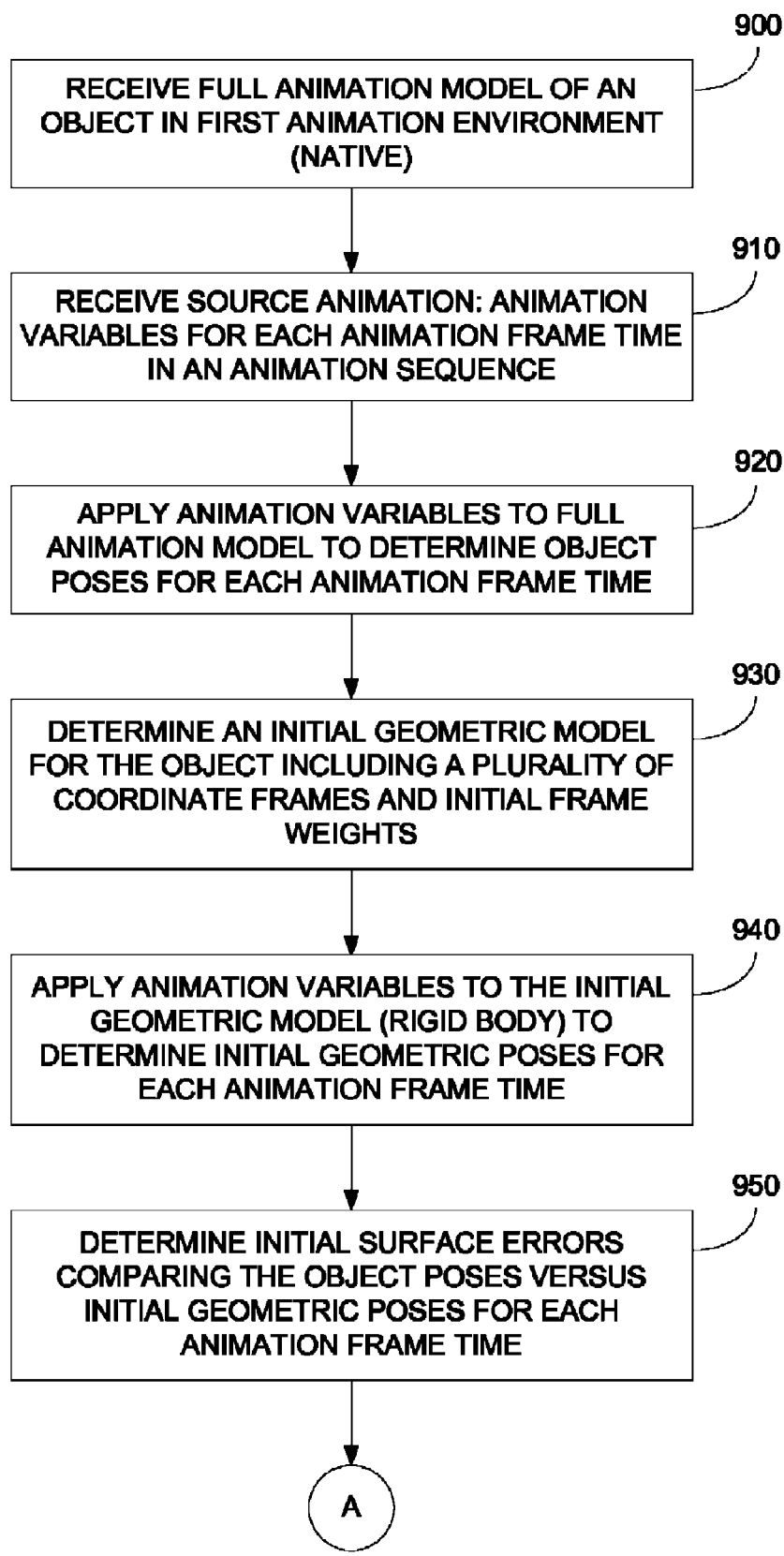
FIGS. 9A-C illustrate a block diagram of a process according to various embodiments of the present invention.
Figure 9B:
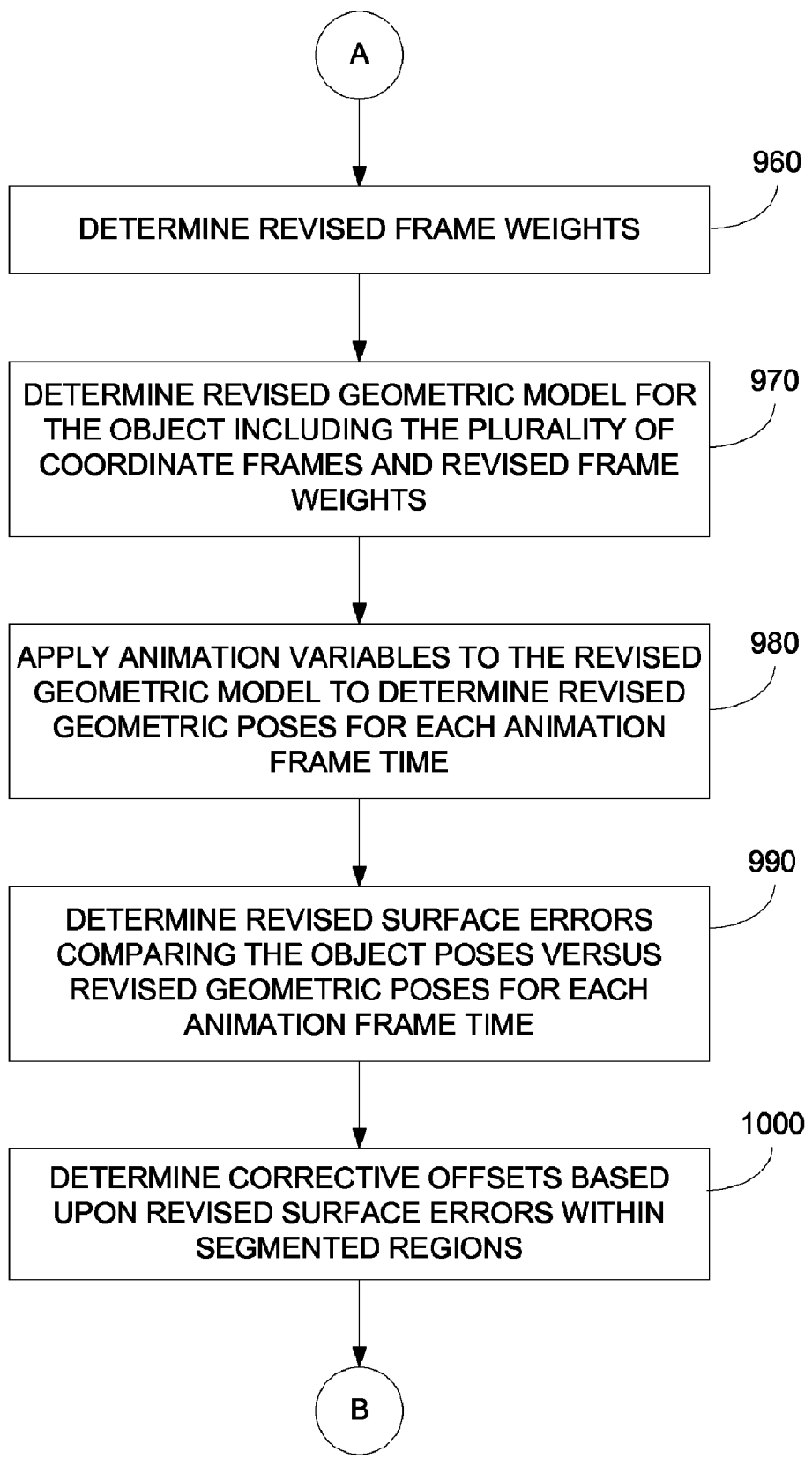
Figure 9C:
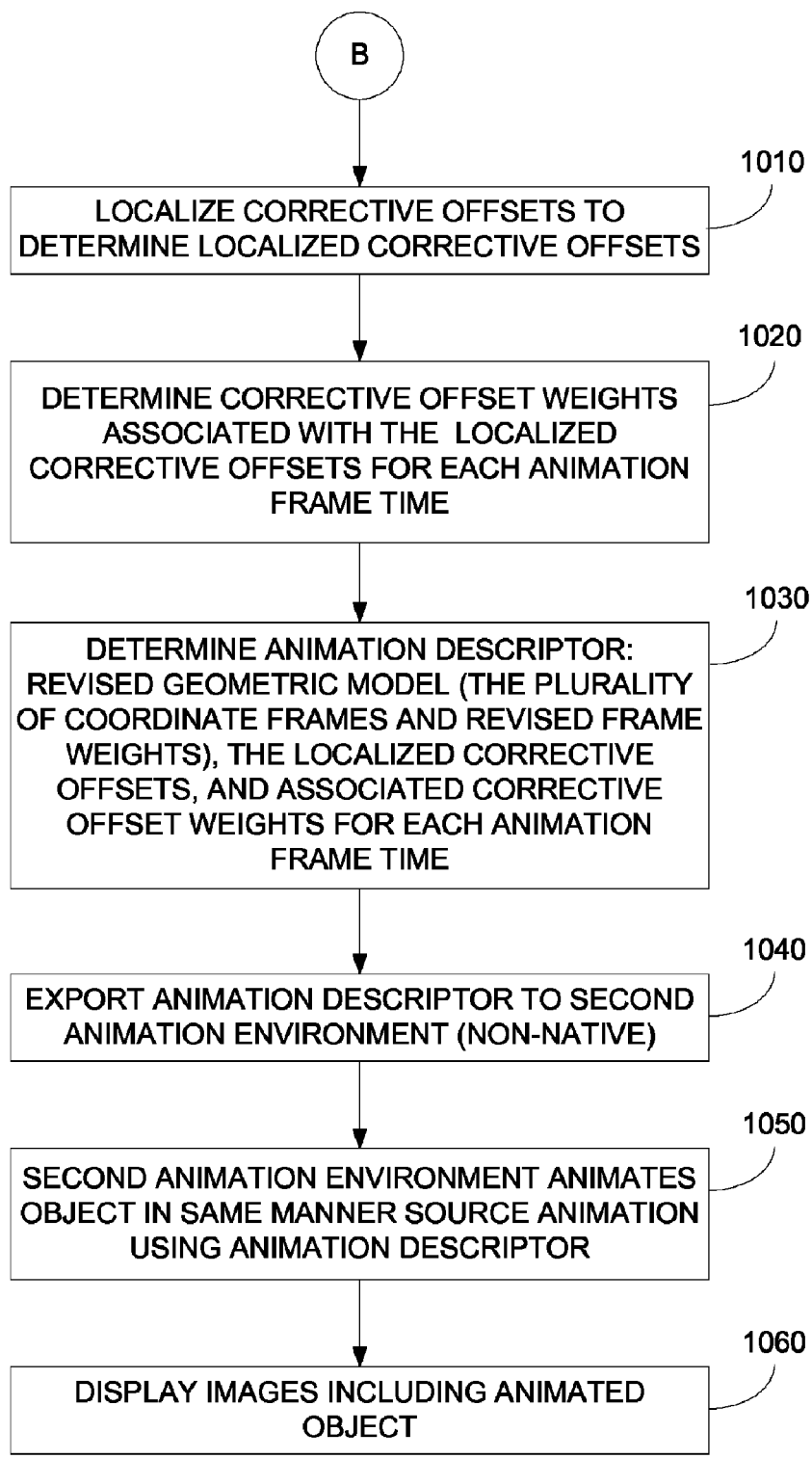

FIGS. 9A-C illustrate a block diagram of a process according to various embodiments of the present invention. More specifically, FIGS. 9A-C illustrate features of additional embodiments of the present invention.

Initially, a character model 200 is determined, step 900. As described above, character model 200 is typically a geometric description of a character (e.g. object to pose) that may have been created using any conventional three-dimensional modeling program or technique. In various embodiments, character model 200 may be determined by a user, e.g. a modeler or rigger, and may be processed and/or manipulated, as described below, by a different user.

In various embodiments of the present invention, a specification of a series of character poses for a series of animation frame (times), e.g. animation data, for character model 200, is also determined, step 910. The animation data is typically specified by a user, e.g. an animator, for one or more animation frame times via values for animation variables. The values for animation variables are typically specified by the user in any number of conventional ways, such as keyboard entry, sliders, or the like. Additionally, the animation variables may be automatically determined through the use of inverse kinematic techniques, through object simulation, or the like. In various embodiments, the number of animation frames may be arbitrary, such as 200 animation frames, 1000 animation frames, 2000 animation frames, or the like. Additionally, the animation frame rate may also vary, such as 10 animation frames per second, 24 animation frames per second, 60 animation frames per second, or the like.

In various embodiments of the present invention, as will be described below, the series of character poses represents animation of character model 200 for a number of animation frames, that is to be exported from the animation environment. Such data may still be considered "training" poses, even though the training poses are the same as the desired output poses for the character. In an example, in some embodiments of the present invention, the animation environment used to specify the animation data is a Pixar proprietary animation system designated "MEnv." The animation data is then compressed and formatted for export into an environment that can understand and use the series of character poses. In various embodiments, the series of character poses may be input for a crowd simulation system (e.g. Massive Software), may be input for an entertainment system, e.g. edutainment, game, may be input for an animated feature (e.g. outsourced animator), CGI, or the like. In other embodiments, any such export of animation of a character is contemplated.

Next, in FIG. 9A, character poses for the character are determined, step 920. In various embodiments, character poses are determined for each animation frame by applying the animation variables to character model 200 for each animation frame. In other embodiments, the character poses may be determined for a subset of animation frames, e.g. 1 of 5 animation frames, 1 in 10 frames, 1 in 100 frames, or the like. In some embodiments of the present invention, the character poses typically specify positions of surfaces of the character, or the like, as described above, such as 240 and 250 that are illustrated in FIG. 2.

In various embodiments of the present invention, an initial geometric model (rigid body) model of the character is retrieved or determined, step 930. This process may be performed in a manner described above in step 505, in FIG. 5. More specifically, a number of reference frames (coordinate reference frames) are initially determined that specify a "sphere of influence" of reference frames to surface regions of the character.

As described above, an initial set of frame weights are determined and associated with the reference frames. Those frame weights are used to determine the initial "sphere of influence" of the reference frames to surface regions of the character. As merely an example, a shoulder reference frame may initially and an elbow reference frame may initially have frame weights in relation to surface position 240 of: 0.3 and 0.7, respectively; 0 and 1.0, respectively; 0.5 and 0.5, respectively, or the like. In various embodiment, the "seeding" or setting of the initial frame weights may be automatically determined based upon geometric relationships, e.g. closest reference frames to surface positions, or the like. As will be described further below, in various embodiments, the initial frame weights are non-negative, and total of the initial frame weights for each surface point sums to 1.0. In various embodiments of the present invention, surface positions on an object may be associated with one, two or more non-zero initial frame weights.

In various embodiments, based upon the initial geometric model and the animation variables, initial geometric character poses for the character are determined, step 940. This process may be performed in a manner described above in steps 510, in FIG. 5. More specifically, the animation variables are applied to the initial geometric model (with the initial frame weights) to determine "rigid" body character poses for the character, e.g. without bicep bulge, etc. In various embodiments, similar to the character poses, the initial geometric poses may be determined for a subset of animation frames, e.g. 1 in 5 frames, 1 in 10 frames, 1 in 100 animation frames, or the like. In various embodiments, the initial geometric poses may be determined for the same animation frame times as the character poses, described above. In other embodiments, the animation frame time may be slightly, e.g. one or two animation frames out of sync, depending upon the accuracy of animation export that is desired, depending upon the character poses (e.g. stationary), depending upon specific engineering purpose, or the like. Larger offsets may be used when the character is stationary, or the like.

In various embodiments of the present invention, a series of (initial) positional surface errors are determined between the surfaces described by the character pose and the initial geometric character pose, for the relevant animation frames, step 950. This process is similar to step 520 in FIG. 5 that was described above. More specifically, for each animation frame, a series of directional distances are typically determined that specifies differences in surface positions (e.g. in three dimensions) between the actual character pose and the rigid body character pose. In various embodiments, the differences may be positive, e.g. for a bulging bicep, or negative, e.g. for a dimple.

Next, in various embodiments, the series of positional surface errors, the number of reference frames, and the initial frame weights are used to determine improved or revised frame weights, step 960. In some embodiments, this step is used to reduce the amount of positional surface errors from the series of positional surface errors, by manipulating or reallocating the frame weights. Any number of conventional methods for determining the improved frame weights may be used for determining improved frame weights, such as hand-weighting, or the like. In some embodiments of the present invention, improved methods for determining the improved frame weights will be described further in conjunction with FIGS. 10A-C. In other embodiments of the present invention, the steps related to revised frames weights may be performed using the initial frame weights.

In various embodiments of the present invention, the revised geometric model (rigid body) model of the character is then determined, step 970, to include the coordinate reference frames and the revised frame weights. This revised geometric model may have one set of revised frame weights for all of the given animation frames, or may have more than one set of revised frame weights for specific groups of animation frames, e.g. a first set of revised weights for animation frames 1-250, a second set of revised weights for animation frames 250-500, and the like. Further detail on such aspects is described in conjunction with FIGS. 10A-C, below.

In various embodiments, based upon the revised geometric model and the animation variables, revised geometric character poses for the character are determined, step 980. As described previously, the animation variables are applied to the revised geometric model (with the set(s) of revised frame weights) to determine revised "rigid" body character poses for the character. In various embodiments, the revised geometric poses may be determined for the same animation frame times as the character poses, described above, or the like.

In various embodiments of the present invention, a series of revised positional surface errors are determined between the surfaces described by the character pose and the revised geometric character pose, for the relevant animation frames, step 990. More specifically, a times series of surface errors (e.g. directional distances) are typically determined between the actual character pose and the revised rigid body character pose, for each animation frame. As described previously, the differences may be in three dimensions, and be positive, e.g. a bulging bicep, or negative, e.g. a dimple. In various embodiments, the series of positional surface errors may be determined for sets of animation frames, or once for all of the given animation frames. For example, a first series of revised positional surface errors may be determined for animation frames 0-250, a second series of revised positional surface errors may be determined for animation frames 251-500, and the like.

Next, based upon the series of revised positional surface errors in step 990, a series of corrective offsets are determined, step 1000. In various embodiments, corrective offset regions may be segmented based upon geometry of the character in the different poses. For example, for a humanoid-type character, separate corrective offset regions or segments may include a left arm region, a right arm region, a torso region, a left leg region, a right arm region, combinations of two or more such regions, or the like. In various embodiments, the corrective offsets may overlap, such as the right arm region and the torso region. In such situations, if a corrective offset is determined for the right arm region, the corrective offset for the torso region may take into account the overlapping corrective offset provided by the right arm region. In various embodiments, based upon the corrective offset geometric segments, a series of initial corrective offsets may be determined based upon the series of positional surface errors (e.g. displacements). As an example, a corrective offset may correspond to a bulging bicep, a corrective offset may correspond to a bulging pectoral muscle, a corrective offset may correspond to a dimple, or the like.

In various embodiments, the initial corrective offsets may be further localized, step 1010. As an example, for each corrective offset region, a linear combination of the initial corrective offsets can be determined to further geometrically localize the corrective offsets. As a result, a plurality of revised corrective offsets is determined.

In various embodiments, the initial corrective offsets and revised corrective offsets can be associated with all of the given animation frames, or associated with sets of animation frames, as described above. Thus, a first set of initial corrective offsets, and a first set of revised corrective offsets can be associated with animation frames 0-300 from 1200 animation frames; or the like.

Next, based upon the revised corrective offsets (for a specific corrective offset region) and the series of positional surface errors (for the same corrective offset region) for each animation frame time, the corrective offset weights are determined for each animation frame time, step 1020. In various embodiments, as discussed above, the corrective offset regions are often segmented based upon the geometry of the character. Accordingly, the revised corrective offsets are weighted such that the weighted corrective offsets approximately equal the series of positional surface errors. In other words, if a revised corrective offset specifies a bicep bulge, a corrective offset weights are determined in this step, such that the weighted corrective offsets roughly equals the position of a bulging bicep of the posed object. For example, as illustrated in FIG. 6C, the weighted corrective offset should specify movement of a bicep to point 654. In various embodiments of the present invention, for a corrective offset region (e.g. right arm), various corrective offset weights are applied to revised corrective offsets until it approximately matches the series of positional surface errors. In various embodiments, a least square error computation, or the like may be applied to determine the corrective offset weights.

In various embodiments, the corrective offset weights are specified for the revised or localized corrective offsets for each animation frame time. In contrast, as discussed above, the revised or localized corrective offsets may be specified for all of the given animation frame times, or may be specified for sets of groups of animation frames (e.g. 0-150, 150-300, and the like).

In various embodiments of the present invention, animation specified in the form of animation variables are converted into animation data, described above. These animation data are then combined into an animation descriptor, step 1030. More specifically, the animator descriptor may include the revised geometric model, described in step 980 (the coordinate reference frames and the revised frame weights), the revised or localized corrective offsets, and the corrective offset weights. In various embodiments, a set of coordinate reference frames are specified for all of the given animation frames. Further, as will be described below, the revised frame weights may be specified once for all of the given animation frames, or may be specified for each set of animation frames. Similarly, as discussed above, the localized corrective offsets may also be specified once for all of the given animation frames, or may be specified for each set of animation frames. Additionally, the corrective offset weights are typically specified for each animation frame.

In various embodiments, the animation descriptor may include one or more data files. The animation descriptor may be transferred or exported to another animation system which is different or physically remote from the animation system providing the steps described herein, step 1040. For example, the creating animation system may be a native (e.g. Pixar proprietary) animation system or environment, such as MEnv, and the other animation system may be a non-native (e.g. non-Pixar) animation system or environment.

It is contemplated that based upon the animation descriptor, the object or character may be animated in the other animation system, step 1050, and displayed, step 1060. In various embodiments, other animation systems may include crowd simulation software (e.g. Massive software), game creation software, interactive animation systems, or the like, for games, for animated features, or the like. In some examples, an input or source animation may include a walk cycle, or the like, for an object. As the result of various embodiments of the present invention, crowd simulation software may receive the animation descriptor and generate a crowd of walking objects based upon the exported animation data. As another example, game creation software may receive the animation descriptor and specify movement for one or more characters for a game, educational software, or the like. As still another example, the animation descriptor may be used by an animation house (e.g. outsourced animation house) to facilitate animation of the object. For example, the animation descriptor may include "trademarked moves" of an animated character from a movie, or the like, and then, based upon the animation descriptor, the animation house may generate additional animated features based upon that animation.

In various embodiments of the present invention, steps 950-980 need not be performed, and step 990 may be performed comparing the initial geometric poses and the object poses for each animation frame time. In various embodiments, step 1010 need not be performed, and in steps 1020 and 1030, the corrective offset weights may be determined based upon the corrective offsets.

Figure 10A:
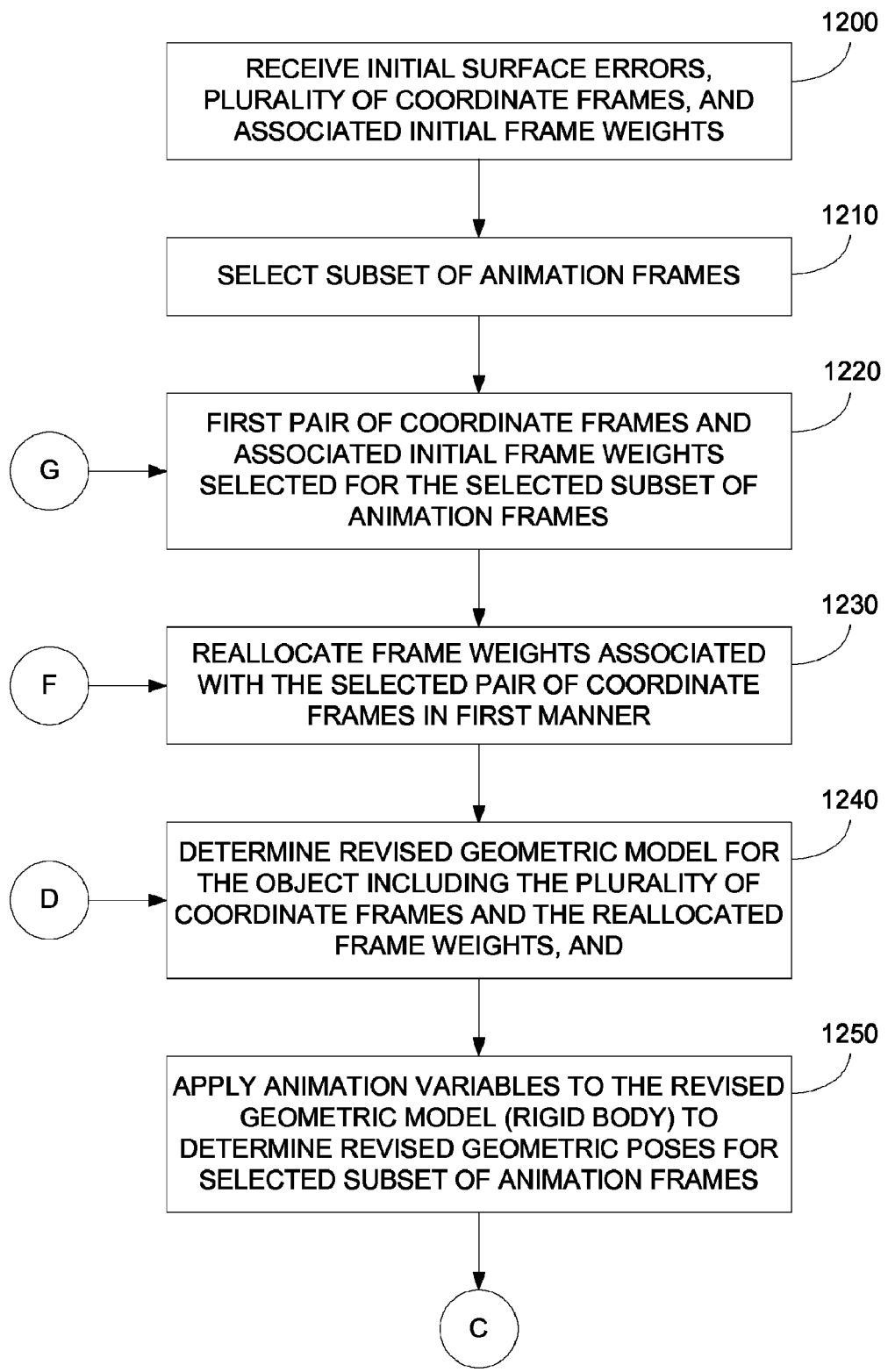
FIGS. 10A-C illustrate a block diagram of a process according to various embodiments of the present invention.
Figure 10B:
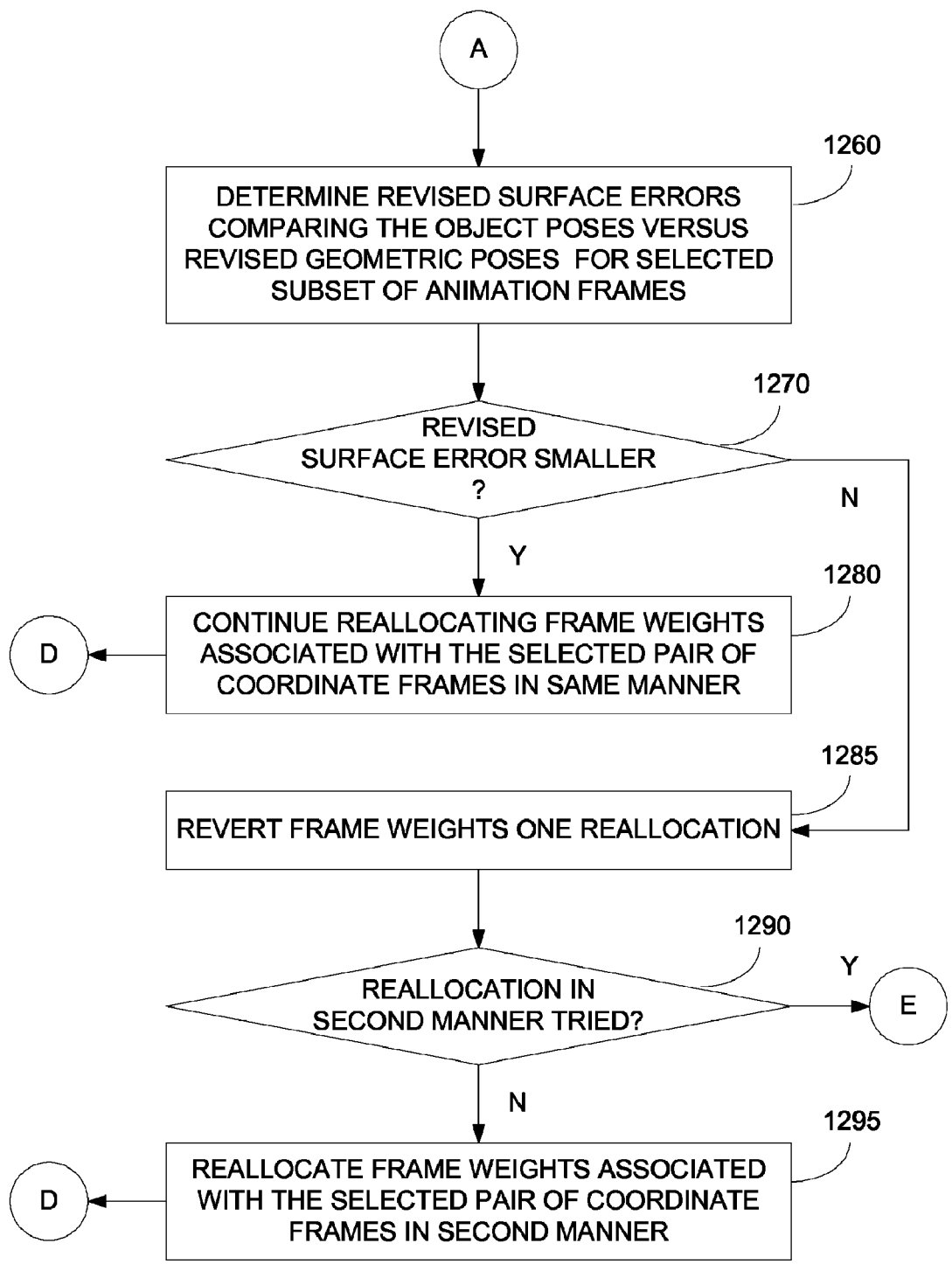
Figure 10C:
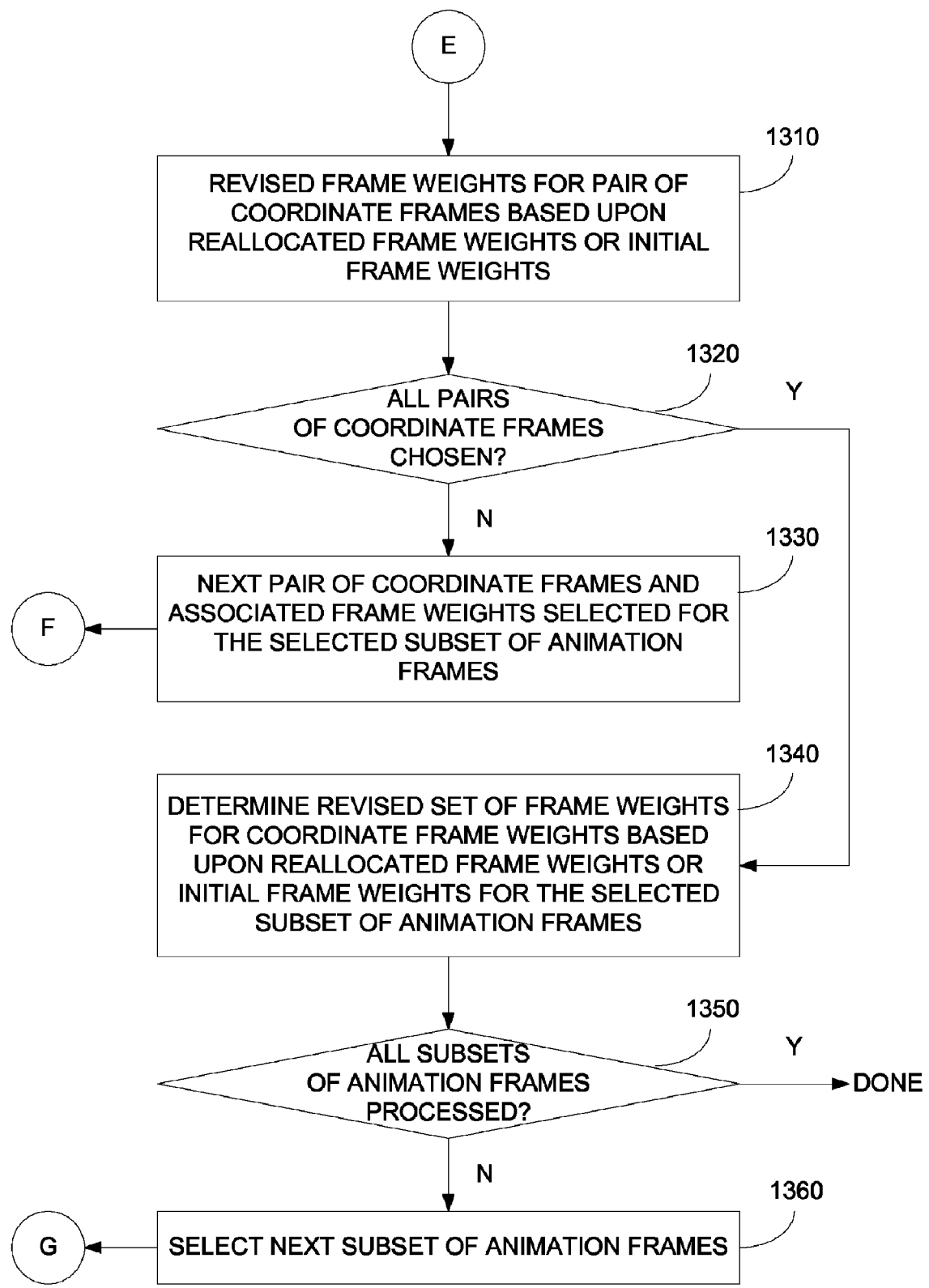

FIGS. 10A-C illustrate a block diagram of a process according to various embodiments of the present invention. More specifically, FIGS. 10A-C illustrate methods for determining frame weights according to embodiments of the present invention. In various embodiments, the data input for this process includes the series of positional surface errors determined in step 950, and the coordinate reference frames and the initial frame weights determined in step 330, step 1200.

Initially, a subset of the animation frames are selected, step 1210. In various embodiments of the present invention, the set of frame weights determined in this process are associated with a subset of animation frames. For example, if there are 900 animation frames, the subset of animation frames may be determined for animation frame 1-100, 101-200, 201-500, or the like. The number of animation frames used to determine sets of frame weights can vary, accordingly. In other embodiments, a single set of frame weights can be determined for all of the animation frames.

As discussed above, in various embodiments of the present invention, surfaces of the object typically have one or more (e.g. three) non-zero initial frame weights. In various embodiments, the frame weights determined in this process sum to 1.0, and the frame weights are non-negative. In various embodiments, the number of coordinate frames and associated frame weights for an object may range from 10 to 100 s, or more.

In various embodiments, a first pair of coordinate frames are selected and the associated initial frame weights are selected from the set of frame weights, step 1220. Next, the frame weights are re-allocated between the pair of frame weights, step 1230. As an example, if the initial frame weight for a first frame is 0.4, and initial frame weight for a second frame is 0.5, the sum of the frame weights to distribute is 0.9 (0.9=0.4+0.5). As merely an example, a first re-allocation may be: (0.3,0.7), (0.1,0.8), (0.5,0.4), or the like. Using this re-allocation of frame weights, a revised geometric model may be determined, step 1240, as was discussed in step 930, above.

Next, in various embodiments, based upon the revised geometric model and the animation variables, a revised geometric character poses for the character are determined, step 1250. This process may be performed in a manner described above in step 930, in FIG. 9A. More specifically, the animation variables are applied to the revised geometric model (with the revised frame weights) to determine revised "rigid" body character poses for the character, e.g. without bicep bulge, etc. In various embodiments, the revised geometric poses may also be determined for the subset of animation frames selected in step 1210, above, or the like.

In various embodiments of the present invention, a series of revised positional surface errors are determined between the surfaces described by the character pose (from step 920) and the revised geometric character pose, for the relevant animation frames, step 1260. This process may be similar to step 950, described above. More specifically, in some embodiments, for each animation frame from the subset of animation frames, a series of directional distances are typically determined that specifies differences in surface positions between the actual character pose and the revised rigid body character pose.

Next, in various embodiments, the series of revised positional surface errors are compared to the series of positional surface errors determined in step 950, above, step 1270. In some embodiments, a least-squares error metric may be used to determine whether the error of the positional surface errors in step 950 are smaller than the error of the revised positional surface errors in step 1260. In other embodiments, the use of other metrics or calculations may also be used to determine which pose provides smaller error.

In various embodiments, a determination is made if the error associated with the series of revised positional surface errors is smaller, step 1270. In various embodiments, if the error is smaller, the frame weights are reallocated in the same direction, as reallocated in step 1230, step 1280. For example, if an initial frame weight allocation is (0.4,0.5), the revised frame weight allocation is (0.5,0.4), and the least-squares error is lowered, the reallocation in this step may further increase the first frame weight. For example, in this step, the newly revised frame weight allocation may be (0.55,0.35), (0.6,0.3), or the like.

In various embodiments, if the error is larger, the frame weights are reverted one reallocation, step 1285. If reallocation of the frame weights in a second manner has not already been tried, step 1290, the frame weights are reallocated in a second manner, or in an opposite direction compared to in step 1230, step 1300. For example, if an initial frame weight allocation is (0.4,0.5), the revised frame weight allocation is (0.5,0.4), and the least-squares error is higher, the reallocation in this step may decrease the first frame weight. For example, in this step, the newly revised frame weight allocation may be (0.35,0.45), (0.3,0.6), or the like.

In various embodiments, the process may be repeated until the reallocation of frame weights does not provide any substantially lower amount of error. The frame weights for the associated coordinate frames are then set and a revised set of frame weights is determined, step 1310. As an example, if an initial frame weight allocation is (0.4,0.5), and the revised frame weight allocation (0.5,0.4) does not provide any decrease in error, the revised frame weight allocation (0.3, 0.6) may be tried. If revised frame weight allocation (0.3,0.6) does not provide any decrease in error, steps 1270 and 1290 may be satisfied, and the frame weight allocation is set to (0.4,0.5). As another example, if an initial frame weight allocation is (0.3,0.2) (with error of "6"), various revised frame weight allocations may be tried including: (0,0.5), (0.1,0.4), (0.2,0.3), (0.4,0.1), and (0.5,0), and the determined errors associated with these frame weight allocations are: "10," "5," "3," "4," "7," for example. In this example, the frame weight allocation (0.2,0.3) associated with the lowest amount of error (e.g. least squares error) "3" is selected to be the frame weight allocation for the two frame weights in step 1310. In other embodiments of the present invention, the reallocation between weights may be any desired amount of accuracy. In the examples above, the accuracy was to the tenth place, and in other examples, the accuracy may be to the hundredth place or the like.

Subsequently, if not all pairs of coordinate frames have been chosen for processing, step 1320, a different pair of coordinate frames are selected, step 1330, and associated pair of frame weights are selected from the revised set of frame weights. In various embodiments, if all combinations of pairs of coordinate frames have been selected and processed, as described above, step 1320, the revised frame weight allocation determined in step 1310 is used for the frame weight allocation for selected set of animation frames, step 1340. As merely an example, if coordinate frames are labeled A, B, C, D, the pairs of coordinate frames may include (A,B), (A,C), (A,D), (B,C), (B,D), and (C,D). It may be recognized that the number of different pairs is an N choose 2 problem, where N is the number of coordinate frames for the object, or roughly an N^2/2 pairs.

It should be recognized that frame weights allocated in one iteration may be reallocated in subsequent allocations. For example, initially, frame weight A=1, B=0, C=0, after a reallocation between A and B: A=0.5, B=0.5, and C=0, the frame weights produces a smaller error. Next, after a reallocation between A and C: A=0.3, B=0.5, and C=0.2, the frame weights produce a smaller error. Then after a reallocation between B and C: A=0.3, B=0.4, and C=0.3, the frame weights produce a smaller error. Accordingly, the frame weights determined for this example are A=0.3, B=0.4, and C=0.3.

In various embodiments of the present invention, if all sets of animation frames have not been processed, as described above, step 1350, the process may be repeated, step 1360, for each set of animation frames until revised frame weights for all of the given animation frames are determined. For example, a first set of frame weights (A1,B1,C1, . . . ) is determined for animation frames 1-200, a second set of frame weights (A2,B2,C2, . . . ) is determined for frames 201-500, a third set of frame weights (A3,B3,C3, . . . ) is determined for frames 501-1000, or the like for the given coordinate frames. In other embodiments, a single set of frame weights may, of course, be used for the given coordinate frames.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for exporting animation data from a first animation system to animation data for a second animation system in a computer system that is programmed to perform the method comprising:
    determining by the computer system, a first plurality of poses associated with an object in response to a first model for the object in the first animation system and to a plurality of animation variables associated with the object in the computer system;
    determining by the computer system, a second model for the object, wherein the second model comprises a geometric model of the object;
    determining by the computer system, a second plurality of poses associated with the object in response to the second model for the object and to the plurality of animation variables in the computer system;
    determining by the computer system, a plurality of surface errors in response to a comparison between the first plurality of poses and the second plurality of poses in the computer system;
    determining by the computer system, a plurality of corrective offsets associated with the object in response to the plurality of surface errors in the computer system;
    determining by the computer system, a plurality of actuation values associated with the plurality of corrective offsets in response to the plurality of surface errors and to the plurality of corrective offsets in the computer system;
    determining by the computer system, a third model for the object compatible with the second animation system in response to the second plurality of poses, the plurality of corrective offsets, and the plurality of actuation values in the computer system; and
    storing by the computer system, the third model for the object in a memory associated with the computer system.

2. The computer implemented method of claim 1 wherein determining the plurality of surface errors comprises:
    determining by the computer system, a plurality of errors in response to a comparison between the first plurality of poses and the second plurality of poses; and
    determining by the computer system, the plurality of surface errors by localizing errors from the plurality of errors.

3. The computer implemented method of claim 2 wherein the plurality of surface errors are geometrically localized.

4. The computer implemented method of claim 1 wherein the second model for the object comprises a plurality of coordinate frames and a plurality of frame weights.

5. The computer implemented method of claim 1 further comprising:
    providing the third model for the object to a remote computer system having the second animation system;

determining a plurality of posed positions for the object in response to the second plurality of poses, the plurality of corrective offsets and the plurality of activation values in the second animation system in the remote computer system; and determining a plurality of images in response to the plurality of posed positions for the object in the second animation system remote computer system.

6. The computer implemented method of claim 5 wherein the second animation system is selected from a group consisting of: a real-time animation system, an entertainment system, a video game system, a crowd simulation system.

7. The computer implemented method of claim 1 wherein determining the plurality of surface errors comprises:
   segmenting by the computer system, the first plurality of poses into a first plurality of pose segments;
   segmenting by the computer system, the second plurality of poses into a second plurality of pose segments;
   determining by the computer system, a plurality of surface error segments in response to the first plurality of pose segments and the second plurality of pose segments;
   wherein the plurality of surface errors comprises the plurality of surface error segments.

8. The computer implemented method of claim 7 wherein segmenting the first plurality of poses comprises determining by the computer system, a first pose segment and a second pose segment, wherein the first pose segment is associated with a first portion of the object that is different from a second portion of the object associated with the second pose segment;
   wherein segmenting the second plurality of poses comprises determining by the computer system, a third pose segment and a fourth pose segment, wherein the third pose segment is associated with the first portion of the object that is different from the second portion of the object associated with the fourth pose segment;
   wherein determining the plurality of surface error segments comprises:
      determining by the computer system, a first surface error segment in response to the first pose segment and the third pose segment; and
      determining by the computer system, a second surface error segment in response to the second pose segment and the fourth pose segment.

9. The computer implemented method of claim 8 wherein determining the second surface error segment is also in response to the first surface error segment.

10. A computer system for exporting animation data from a first animation system to animation data for a second animation system, the computer system comprising:
    a memory configured to store a first model for an object within the first animation system, and configured to store a plurality of animation variables associated with the object; and
    a processor coupled to the memory, wherein the processor is configured to determining a first plurality of poses associated with an object in response to a first model for the object in the first animation system and to a plurality of animation variables, configured to determine a second model for the object, wherein the second model comprises a geometric model of the object, configured to determine a second plurality of poses associated with the object in response to the second model for the object and to the plurality of animation variables, configured to determine a plurality of surface errors in response to a comparison between the first plurality of poses and the second plurality of poses, configured to determine a plurality of corrective offsets associated with the object in response to the plurality of surface errors in the computer system, configured to determine a plurality of actuation values associated with the plurality of corrective offsets in response to the plurality of surface errors and to the plurality of corrective offsets in the computer system, and configured to determine a third model for the object compatible with the second animation system in response to the second plurality of poses, the plurality of corrective offsets, and the plurality of actuation values;
    wherein the memory is also configured to store the third model for the object compatible with the second animation system.

11. The computer system of claim 10
    wherein the processor is also configured to determine a plurality of errors in response to a comparison between the first plurality of poses and the second plurality of poses, and configured to determine the plurality of surface errors by localizing errors from the plurality of errors;
    wherein the plurality of surface errors are geometrically localized.

12. The computer system of claim 10 wherein the processor is also configured to provide the third model for the object to a remote computer system having the non second animation system, configured to determine a plurality of posed positions for the object in response to the second plurality of poses, the plurality of corrective offsets and the plurality of activation values in the second animation system in the remote computer system, and configured to determine a plurality of images in response to the plurality of posed positions for the object in the non second animation system remote computer system.

13. The computer system of claim 12 wherein the second animation system is selected from a group consisting of: a real-time animation system, an entertainment system, a video game system, a crowd simulation system.

14. The computer system of claim 10
    wherein the processor is also configured to segment the first plurality of poses into a first plurality of pose segments, configured to segment the second plurality of poses into a second plurality of pose segments, and configured to determine a plurality of surface error segments in response to the first plurality of pose segments and the second plurality of pose segments;
    wherein the plurality of surface errors comprises the plurality of surface error segments.

15. The computer system of claim 14
    wherein the processor is configured to determine a first pose segment and a second pose segment, wherein the first pose segment is associated with a first portion of the object that is different from a second portion of the object associated with the second pose segment, configured to determine a third pose segment and a fourth pose segment, wherein the third pose segment is associated with the first portion of the object that is different from the second portion of the object associated with the fourth pose segment, configured to determine a first surface error segment in response to the first pose segment and the third pose segment, and configured to determine a second surface error segment in response to the second pose segment and the fourth pose segment.

16. The computer system of claim 15 wherein the processor is configured to determine the second surface error segment in response to the first surface error segment.

17. A non-transitory computer program product for exporting animation data from a first animation system to animation data for a second animation system residing on a tangible medium and executable on a computer system including a processor and a memory comprising:
- code that directs the processor to determine a first plurality of poses associated with an object in response to a first model for the object in the first animation system and to a plurality of animation variables associated with the object in the computer system;
- code that directs the processor to determine a second model for the object, wherein the second model comprises a geometric model of the object;
- code that directs the processor to determine a second plurality of poses associated with the object in response to the second model for the object and to the plurality of animation variables in the computer system;
- code that directs the processor to determine a plurality of surface errors in response to a comparison between the first plurality of poses and the second plurality of poses in the computer system;
- code that directs the processor to determining a plurality of corrective offsets associated with the object in response to the plurality of surface errors in the computer system;
- code that directs the processor to determine a plurality of actuation values associated with the plurality of corrective offsets in response to the plurality of surface errors and to the plurality of corrective offsets in the computer system;
- code that directs the processor to determine a third model for the object compatible with the second animation system in response to the second plurality of poses, the plurality of corrective offsets, and the plurality of actuation values in the computer system; and
- code that directs the processor to store the third model for the object in the memory associated with the computer system.

18. The non-transitory computer program product of claim 17 further comprising:
- code that directs the processor to determine a plurality of errors in response to a comparison between the first plurality of poses and the second plurality of poses; and
- code that directs the processor to determine the plurality of surface errors by localizing errors from the plurality of errors.

19. The non-transitory computer program product of claim 17 further comprising:
- code that directs the processor to provide the third model for the object to a remote computer system having the second animation system;
- code that directs the processor to determine a plurality of posed positions for the object in response to the second plurality of poses, the plurality of corrective offsets and the plurality of activation values in the second animation system in the remote computer system; and
- code that directs the processor to determine a plurality of images in response to the plurality of posed positions for the object in the second animation system remote computer system.

20. The non-transitory computer program product of claim 19 wherein the second animation system is selected from a group consisting of: a real-time animation system, an entertainment system, a video game system, a crowd simulation system.

21. The non-transitory computer program product of claim 17 further comprising:
- code that directs the processor to segment the first plurality of poses into a first plurality of pose segments;
- code that directs the processor to segment the second plurality of poses into a second plurality of pose segments;
- code that directs the processor to determine a plurality of surface error segments in response to the first plurality of pose segments and the second plurality of pose segments;
- wherein the plurality of surface errors comprises the plurality of surface error segments.

22. The non-transitory computer program product of claim 21 further comprising:
- code that directs the processor to determine a first pose segment and a second pose segment, wherein the first pose segment is associated with a first portion of the object that is different from a second portion of the object associated with the second pose segment;
- code that directs the processor to determine a third pose segment and a fourth pose segment, wherein the third pose segment is associated with the first portion of the object that is different from the second portion of the object associated with the fourth pose segment;
- code that directs the processor to determine a first surface error segment in response to the first pose segment and the third pose segment; and
- code that directs the processor to determine a second surface error segment in response to the second pose segment and the fourth pose segment.

23. The non-transitory computer program product of claim 22 further comprising code that directs the processor to determine the second surface error segment also in response to the first surface error segment.

24. A computer implemented method for forming an improved model of an object in a computer system, performed by the computer system that is programmed to perform the method, comprising:
- determining by the computer system, a first plurality of poses associated with an object in response to a first model for the object and to a plurality of animation variables associated with the object, wherein the first model comprises a plurality of coordinate frames;
- determining by the computer system, a plurality of initial coordinate frame weights in response to the plurality of coordinate frames, and the plurality of animation values;
- determining by the computer system, a second plurality of poses associated with the object in response to the plurality of coordinate frames, to the plurality of initial coordinate frame weights, and to the plurality of animation variables;
- determining by the computer system, a first plurality of surface errors in response to the first plurality of poses and the second plurality of poses;
- reallocating by the computer system, the plurality of initial coordinate frame weights to form a plurality of revised coordinate frame weights in response to the plurality of surface errors, wherein revised coordinate frame weights from the plurality of initial coordinate frame weights are non-negative;
- determining by the computer system, a third plurality of poses associated with the object in response to the plurality of coordinate frames, to the plurality of revised coordinate frame weights, and to the plurality of animation variables;

forming by the computer system, a second model for the object in response to the plurality of coordinate frames and to the plurality of revised coordinate frame weights; and storing the second model for the object in a memory of the computer system.

25. The computer implemented method of claim 24 wherein reallocating the plurality of initial coordinate frame weights to form the plurality of proposed coordinate frame weights comprises:

selecting by the computer system, a first pair of non-negative coordinate frame weights from the plurality of initial coordinate frame weights; and reallocating by the computer system, weights between the first pair of non-negative coordinate frame weights in a first proportion.

26. The computer implemented method of claim 25 wherein reallocating the plurality of initial coordinate frame weights to form the plurality of proposed coordinate frame weights further comprises:

reallocating by the computer system, weights between the first pair of non-negative coordinate frame weights in a second proportion.

27. The computer implemented method of claim 25 further comprising:

determining by the computer system, a second plurality of surface errors in response to the first plurality of poses and the third plurality of poses;

determining by the computer system, a reduced error condition whether surface errors from the first plurality of surface errors exceed surface errors from the second plurality of surface errors; and wherein forming the second model for the object is also in response to the reduced error condition.

28. The computer implemented method of claim 25 wherein reallocating the weights comprises:

subtracting by the computer system, a value from a first non-negative coordinate frame weight from the first pair; and adding by the computer system, the value to a second non-negative coordinate frame weight from the first pair.

29. The computer implemented method of claim 24 wherein the first plurality of poses and the second plurality of poses are associated with a plurality of animation frames.

30. A computer system for forming an improved model of an object comprising:

a memory configured to store a first model for the object comprising a plurality of coordinate frames, and configured to store a plurality of animation variables associated with the object; and a processor coupled to the memory, wherein the processor is configured to determine a first plurality of poses associated with an object in response to the first model for the object and to the plurality of animation variables associated with the object, configured to determine a plurality of initial coordinate frame weights in response to the plurality of coordinate frames, and the plurality of animation values, configured to determine a second plurality of poses associated with the object in response to the plurality of coordinate frames, to the plurality of initial coordinate frame weights, and to the plurality of animation variables, configured to determine a first plurality of surface errors in response to the first plurality of poses and the second plurality of poses, configured to reapportion the plurality of initial coordinate frame weights to form a plurality of revised coordinate frame weights in response to the plurality of surface errors, wherein revised coordinate frame weights from the plurality of initial coordinate frame weights are non-negative, configured to determine a third plurality of poses associated with the object in response to the plurality of coordinate frames, to the plurality of revised coordinate frame weights, and to the plurality of animation variables, and configured to form a second model for the object in response to the plurality of coordinate frames and to the plurality of revised coordinate frame weights; and wherein the memory is also configured to store the second model for the object in a memory of the computer system.

31. The computer system of claim 30 wherein the processor is configured to select a first pair of non-negative coordinate frame weights from the plurality of initial coordinate frame weights, and configured to reapportion weights between the first pair of non-negative coordinate frame weights in a first proportion.

32. The computer system of claim 31 wherein the processor is configured to reapportion weights between the first pair of non-negative coordinate frame weights in a second proportion.

33. The computer system of claim 31 wherein the processor is configured to determine a second plurality of surface errors in response to the first plurality of poses and the third plurality of poses, configured to determine a reduced error condition whether surface errors from the first plurality of surface errors exceed surface errors from the second plurality of surface errors, and configured to form the second model for the object is in response to the reduced error condition.

34. The computer system of claim 30 wherein the processor is configured to subtract a value from a first non-negative coordinate frame weight from the first pair, and configured to add the value to a second non-negative coordinate frame weight from the first pair.

35. A non-transitory computer program product for forming an improved model of an object on a tangible medium and executable on a computer system including a processor and a memory comprising:

code that directs the processor to determine a first plurality of poses associated with the object in response to a first model for the object and to a plurality of animation variables associated with the object, wherein the first model comprises a plurality of coordinate frames;

code that directs the processor to determine a plurality of initial coordinate frame weights in response to the plurality of coordinate frames, and the plurality of animation values;

code that directs the processor to determine a second plurality of poses associated with the object in response to the plurality of coordinate frames, to the plurality of initial coordinate frame weights, and to the plurality of animation variables;

code that directs the processor to determine a first plurality of surface errors in response to the first plurality of poses and the second plurality of poses;

code that directs the processor to reallocate the plurality of initial coordinate frame weights to form a plurality of revised coordinate frame weights in response to the plurality of surface errors, wherein revised coordinate frame weights from the plurality of initial coordinate frame weights are non-negative;

code that directs the processor to determine a third plurality of poses associated with the object in response to the plurality of coordinate frames, to the plurality of revised coordinate frame weights, and to the plurality of animation variables;

code that directs the processor to form a second model for the object in response to the plurality of coordinate frames and to the plurality of revised coordinate frame weights; and code that directs the processor to store the second model for the object in a memory of the computer system.

36. The non-transitory computer program product of claim 35 further comprising:

code that directs the processor to select a first pair of non-negative coordinate frame weights from the plurality of initial coordinate frame weights; and code that directs the processor to reallocate weights between the first pair of non-negative coordinate frame weights in a first proportion.

37. The non-transitory computer program product of claim 36 further comprising code that directs the processor to redistribute weights between the first pair of non-negative coordinate frame weights in a second proportion.

38. The non-transitory computer program product of claim 35 further comprising:

code that directs the processor to determine a second plurality of surface errors in response to the first plurality of poses and the third plurality of poses;

code that directs the processor to determine a reduced error condition whether surface errors from the first plurality of surface errors exceed surface errors from the second plurality of surface errors; and code that directs the processor to form the second model for the object in response to the reduced error condition.

39. The non-transitory computer program product of claim 35 wherein the first plurality of poses and the second plurality of poses are associated with a plurality of animation frames.

* * * * *